(12) United States Patent
Wu et al.

(10) Patent No.: US 11,550,175 B2
(45) Date of Patent: Jan. 10, 2023

(54) OPTICAL PULSE SHAPING METHOD AND SYSTEM BASED ON MULTI-FREQUENCY ACOUSTIC-OPTIC DEFLECTION AND RETRO-DIFFRACTION BASED MULTI-DELAY GENERATION

(71) Applicant: Fudan University, Shanghai (CN)

(72) Inventors: Saijun Wu, Shanghai (CN); Yudi Ma, Shanghai (CN); Xing Huang, Shanghai (CN)

(73) Assignee: FUDAN UNIVERSITY, Shanghai (CN)

( * ) Notice: Subject to any disclaimer, the term of this patent is extended or adjusted under 35 U.S.C. 154(b) by 209 days.

(21) Appl. No.: 17/130,109

(22) Filed: Dec. 22, 2020

(65) Prior Publication Data

US 2021/0199998 A1 Jul. 1, 2021

(30) Foreign Application Priority Data

Dec. 31, 2019 (CN) .......................... 201911401004.X

(51) Int. Cl.
*G02F 1/11* (2006.01)

(52) U.S. Cl.
CPC .......... *G02F 1/113* (2013.01); *G02F 2203/22* (2013.01); *G02F 2203/26* (2013.01)

(58) Field of Classification Search
CPC ...... G02F 1/113; G02F 1/116; G02F 2203/22; G02F 2203/26; G02F 2203/28; G02F 2203/54; G02F 2201/307
See application file for complete search history.

(56) References Cited

U.S. PATENT DOCUMENTS

| | | | | |
|---|---|---|---|---|
| 5,002,349 A | * | 3/1991 | Cheung | G02F 1/125 359/285 |
| 2001/0050787 A1 | * | 12/2001 | Crossland | G02F 1/292 359/9 |
| 2004/0012837 A1 | * | 1/2004 | Kaplan | G02F 1/116 359/285 |

OTHER PUBLICATIONS

A. Monmayrant et al., "A newcomers guide to ultrashort pulse shaping and characterization," J. Phys. B: At., Mol. Opt. Phys. 43(10), 103001 (2010).
A. M. Weiner, "Ultrafast optical pulse shaping: A tutorial review," Opt. Commun. 284(15), pp. 3669-3692 (2011).
M. O. Scully, "Single photon subradiance: Quantum control of spontaneous emission and ultrafast readout," Phys. Rev. Lett. 115(24), 243602 (2015).

(Continued)

*Primary Examiner* — Christopher Stanford
*Assistant Examiner* — Journey F Sumlar
(74) *Attorney, Agent, or Firm* — Crowell & Moring LLP

(57) ABSTRACT

This present disclosure describes a method, a device, and a system for performing a pulse shaping method that accurately converts short laser pulses into arbitrarily programmable optical waveforms with much longer duration. The optical pulse shaping method is based on multi-frequency acoustic-optic modulation and retro-diffraction based multiple optical delay line generation. Regarding the optical pulse shaping method, precise high-speed programming control on amplitudes, phases, and delays of a picosecond ultrashort sub-pulse sequence is implemented, to obtain an arbitrary waveform optical pulse with a near-THz bandwidth and a coherence time up to nanoseconds, for applications in quantum control of atomic/molecular optical transition.

13 Claims, 9 Drawing Sheets

(56) References Cited

OTHER PUBLICATIONS

Y. He et al., "Geometric control of collective spontaneous emission," https://arxiv.org/abs/1910.02289.
M. O. Scully et al., *Quantum Optics*, Cambridge University Press, 1997.
M. Garwood et al., "Advances in Magnetic Resonance, The Return of the Frequency Sweep:Designing Adiabatic Pulses for Contemporary NMR," J. Magn. Reson. 153(2), pp. 155-177, (2001).
D. Goswami, "Optical pulse shaping approaches to coherent control," Phys. Rep. 374, pp. 385-481 (2003).
S. Zhdanovich et al., "Population Transfer between Two Quantum States by Piecewise Chirping of Femtosecond Pulses: Theory and Experiment," Phys. Rev. Lett. 100, 103004 (2008).
N. Picque et al., "Frequency comb spectroscopy," Nat. Photonics 13(3), pp. 146-157 (2019).
D. Heinrich et al., "Ultrafast coherent excitation of a 40Ca+ ion," New J. Phys. 21, 073017 (2019).
N. Khanejaa et al., "Optimal control of coupled spin dynamics: design of NMR pulse sequences by gradient ascent algorithms," J. Magn. Reson. 172(2), pp. 296-305 (2005).
S. Odedra et al., "Improved background suppression in 1H MAS NMR using composite pulses," J. Magn. Reson. 221, pp. 41-50 (2012).
T. Ichikawa et al., "Geometric aspects of composite pulses," Philos. Trans. R. Soc., A 370(1976), pp. 4671-4689 (2012).
G. T. Genov et al., "Correction of arbitrary field errors in population inversion of quantum systems by universal composite pulses," Phys. Rev. Lett. 113(4), 043001 (2014).
X. Rong et al., "Experimental fault-tolerant universal quantum gates with solid-state spins under ambient conditions," Nat. Commun. 6(1), 8748 (2015).
G. H. Low et al., "Methodology of Resonant Equiangular Composite Quantum Gates," Phys. Rev. X 6, 041067 (2016).
X. Miao et al., "Strong optical forces from adiabatic rapid passage," Phys. Rev. A: At., Mol., Opt. Phys. 75(1), 011402 (2007).
C. E. Rogers et al., "Nanosecond pulse shaping at 780 nm with fiber-based electro-optical modulators and a double-pass tapered amplifier," Opt. Express 24(3), pp. 2596-2606 (2016).
P. Emplit et al., "Passive amplitude and phase picosecond pulse shaping," Opt. Lett. 17(19), pp. 1358-1360 (1992).
D. E. Leaird et al., "Femtosecond optical packet generation by a direct space-to-time pulse shaper," Opt. Lett. 24(12), pp. 853-855 (1999).
O. Mendoza-Yero et al., "Diffractive pulse shaper for arbitrary waveform generation," Opt. Lett. 35(4), pp. 535-537 (2010).
T. Mansuryan et al., "Compact direct space-to-time pulse shaping with a phase-only spatial light modulator," Opt. Lett. 36(9), pp. 1635-1637 (2011).
M. E. Fermann et al., "Shaping of ultrashort optical pulses by using an integrated acousto-optic tunable filter," Opt. Lett. 18(18), 1505 (1993).
P. Tournois, "Acousto-optic programmable dispersive filter for adaptive compensation of group delay time dispersion in laser systems," Opt. Commun. 140(4-6), pp. 245-249 (1997).
C. J. Hawthorn et al., "Littrow configuration tunable external cavity diode laser with fixed direction output beam," Rev. Sci. Instrum. 72(12), pp. 4477-4479 (2001).
J. F. Leger et al., "Fast spatial beam shaping by acousto-optic diffraction for 3D non-linear microscopy," Opt. Express 23, 28191 (2015).
D. A. Steck, "Rubidium 87 D Line Data," http://steck.us/alkalidata (revision 2.1.5, Jan. 13, 2015).
W. Happer et al., "Optically Pumped Atoms" (Wiley-VCH, 2010).
F. D. Fuller et al., "Experimental Implementations of Two-Dimensional Fourier Transform Electronic Spectroscopy," Annu. Rev. Phys. Chem. 66(1), pp. 667-690 (2015).
C. W. Siders et al., "Efficient High-Energy Pulse-Train Generation Using a 2n-Pulse Michelson Interferometer," Appl. Opt. 37(22), pp. 5302-5305 (1998).
B. Dromey et al., "Generation of a train of ultrashort pulses from a compact birefringent crystal array," Appl. Opt. 46(22), pp. 5142-5146 (2007).
P. F. Tekavec et al., "Fluorescence-detected two-dimensional electronic coherence spectroscopy by acousto-optic phase modulation," J. Chem. Phys. 127(21), 214307 (2007).
A. D. Bristow et al., "A versatile ultrastable platform for optical multidimensional fourier-transform spectroscopy," Rev. Sci. Instrum. 80(7), 073108 (2009).
C. Froehly et al., "Shaping and analysis of picosecond light pulses," Prog. Opt. 20, pp. 63-153 (1983).
A. M. Weiner, "Femtosecond pulse shaping using spatial light modulators," Rev. Sci. Instrum. 71(5), pp. 1929-1960 (2000).
G. Stobrawa et al., "A new high-resolution femtosecond pulse shaper," Appl. Phys. B 72(5), pp. 627-630 (2001).
H. P. Sardesai et al., "A Femtosecond Code-Division Multiple-Access Communication System Test Bed," J. Lightwave Technol. 16(11), pp. 1953-1964 (1998).
D. Meshulach et al., "Coherent quantum control of two-photon transitions by a femtosecond laser pulse," Nature 396(6708), pp. 239-242 (1998).
N. Dudovich et al., "Single-pulse coherently controlled nonlinear raman spectroscopy and microscopy," Nature 418(6897), pp. 512-514 (2002).
P. Tian et al., "Femtosecond Phase-Coherent Two-Dimensional Spectroscopy," Science 300(5625), pp. 1553-1555 (2003).
K. W. Stone et al., "Two-quantum 2d ft electronic spectroscopy of Biexcitons in GaAs quantum wells," Science 324(5931), pp. 1169-1173 (2009).
B. J. Sussman et al., "Focusing of light following a 4-f pulse shaper: Considerations for quantum control," Phys. Rev. A 77(4), 043416 (2008).
F. Frei et al., "Space-time coupling in femtosecond pulse shaping and its effects on coherent control," J. Chem. Phys. 130(3), 034302 (2009).
Z. Jiang et al., "Line-by-line pulse shaping control for optical arbitrary waveform generation," Opt. Express 13(25), pp. 10431-10439 (2005).
C. B. Huang et al., "Spectral line-by-line shaping for optical and microwave arbitrary waveform generations," Laser Photonics Rev. 2(4), pp. 227-248 (2008).
F. Ferdous et al., "Spectral line-by-line pulse shaping of on-chip microresonator frequency combs," Nat. Photonics 5(12), pp. 770-776 (2011).
J. T. Willits et al., "Line-by-line pulse shaping with spectral resolution below 890 MHz," Opt. Express 20(3), pp. 3110-3117 (2012).
X. Long et al., "Suppressed Spontaneous Emission for Coherent Momentum Transfer," Phys. Rev. Lett. 123(3), 033603 (2019).
A. M. Jayich et al., "Continuous all-optical deceleration and single-photon cooling of molecular beams," Phys. Rev. A 89(2), 023425 (2014).
T. G. M Freegarde et al., "Confinement and manipulation of atoms using short laser pulses," Opt. Commun. 117(3-4), pp. 262-267 (1995).
A. Goepfert et al., "Stimulated focusing and deflection of an atomic beam using picosecond laser pulses," Phys. Rev. A 56(5), R3354-R3357 (1997).
A. D. Cronin et al., "Optics and interferometry with atoms and molecules," Rev. Mod. Phys. 81(3), pp. 1051-1129 (2009).
A. Dunning et al., "Composite pulses for interferometry in a thermal cold atom cloud," Phys. Rev. A 90(3), 033608 (2014).
J. Mizrahi et al., "Quantum control of qubits and atomic motion using ultrafast Taser pulses," Appl. Phys. B 114(1-2), pp. 45-61 (2014).
J. D. Wong-Campos et al., "Demonstration of two-atom entanglement with ultrafast optical pulses," Phys. Rev. Lett. 119(23), 230501 (2017).
D. Jacob et al., "Production of sodium Bose Einstein condensates in an optical dimple trap," New J. Phys. 13(6), 065022 (2011).

\* cited by examiner performing, by an acoustic-optic deflector, deflection of an incident mode-locked laser beam into a multiple-directions through Bragg diffraction-based multi-frequency acoustic-optic deflection 910 converting, by a lens combination, an array of multi-direction diffraction beams into an array of weakly focused parallel beams, and transmitting the array of weakly focused parallel beams incident on a grating. 920 performing, by the grating, retro-diffraction of the parallel beam array within their Rayleigh range $z\_R$ leading to a second pass through the lens combination and a secondary acoustic-optic deflection. 930 ensuring, by an approximate time-reversal-symmetry of the retro-diffraction, a high-quality space mode and a delay range up to $T\_max \sim 2*z\_R/c$ for all resulting sub-pulse, wherein c is a speed of light and a multi-sub-pulse output is coupled to a single-mode device with sub-pulse-parameter insensitive coupling efficiency. 940 controlling, by a radio frequency (RF) signal programming device, a relative delay, an amplitude, and a phase of each sub-pulse through programming frequency, amplitude, and phase of a correspondent RF signal for driving the acoustic-optic deflector respectively. 950 simultaneously detecting, by using a continuous acoustic-optic modulation beat frequency signal, a phase and an amplitude of the acoustic-optic deflected sub-pulse, correcting relative phase drift, and performing non-linear correction on diffraction efficiency through updating the RF signal. 960

FIG. 9

OPTICAL PULSE SHAPING METHOD AND SYSTEM BASED ON MULTI-FREQUENCY ACOUSTIC-OPTIC DEFLECTION AND RETRO-DIFFRACTION BASED MULTI-DELAY GENERATION

RELATED APPLICATION

This application claims priority to Chinese Patent Application No. 201911401004.X, filed in China National Intellectual Property Administration on Dec. 31, 2019, which is incorporated herein by reference in its entirety.

BACKGROUND

Technical Field

The present disclosure belongs to the field of pulsed laser control technologies, and in particular, to an optical pulse shaping method and system.

Related Art

Optical pulse shaping technology plays an important role in the fields of high-precision spectroscopy research and coherent quantum control. In the field of ultrafast optics, a multi-dimensional coherence spectroscopy (MDCS) technology reveals the coherence dynamics of a sample by using multi-pulse excitation and coherent detection. For example, in 2003 and 2007, Chinese scientist Peifang Tian (from Princeton University) and American scientist Patrick F. Tekavec (from Michigan University) respectively studied the MDCS technology. MDCS requires phase-stable multi-channel tunable optical delays. In particular, high-resolution non-linear spectral analysis with interrogation time beyond picoseconds generally requires a phase-stable optical-mechanical delay line, but such mechanical delay is difficult to maintain its fast and arbitrary programmability.

The present disclosure describes various embodiments including an optical pulse shaping method, which addresses at least some of the issues/problems discussed above.

SUMMARY

The objective of the present disclosure is to provide an optical pulse shaping method to convert an incoming mode-locked picosecond (or femtosecond) pulse into an arbitrary optical waveform, with pulse shaping bandwidth from 10 s of GHz up to THz, and with a pulse duration from 100 s of picosecond up to nanoseconds.

The present disclosure describes an optical pulse shaping method based on multi-frequency acoustic-optic modulation and retro-diffraction based multiple optical delay line generation. The optical pulse shaping method includes: performing, by an acoustic-optic deflector, deflection of an incident mode-locked laser beam into a multiple-directions through Bragg diffraction-based multi-frequency acoustic-optic deflection; converting, by a lens combination, an array of multi-direction diffraction beams into an array of weakly focused parallel beams, and transmitting the array of weakly focused parallel beams incident on a grating; performing, by the grating, retro-diffraction of the parallel beam array within their Rayleigh range $\tilde{z}_R$ leading to a second pass through the lens combination and a secondary acoustic-optic deflection; ensuring, by an approximate time-reversal-symmetry of the retro-diffraction, a high-quality space mode and a delay range up to $\tau_{max} = 2\tilde{z}_R/c$ for all resulting sub-pulse, wherein c is a speed of light and a multi-sub-pulse output is coupled to a single-mode device with sub-pulse-parameter insensitive coupling efficiency; controlling, by a radio frequency (RF) signal programming device, a relative delay, an amplitude, and a phase of each sub-pulse through programming frequency, amplitude, and phase of a correspondent radio frequency (RF or rf) signal for driving the acoustic-optic deflector respectively; and simultaneously detecting, by using a continuous acoustic-optic modulation beat frequency signal, a phase and an amplitude of the acoustic-optic deflected sub-pulse, correcting relative phase drift, and performing non-linear correction on diffraction efficiency through updating the RF signal.

The present disclosure describes a system for performing an optical pulse shaping method. The system includes a RF signal programming device, an acoustic-optic device comprising at least one of an acoustic-optic modulator or an acoustic-optic deflector, an optical lens system, a grating, and a frequency-stabilized laser system monitor. In the RF signal programming device, a user writes the frequency, amplitude, and phase of each component of an RF signal, and programmed RF signals are then combined, amplified, and transmitted to drive the acoustic-optical device in forms of sine waves; the acoustic-optic device converts the RF signal into a sound wave signal with a corresponding frequency, intensity, and phase, and performs multi-angle diffraction on an incident pulsed laser, to achieve an objective of beam splitting; based on acoustic-optic deflection principle, deflection angles between the incident pulsed laser and deflected beams are proportional to the frequencies of the sound wave signal under small angle approximation, so as to be configured by programming the frequencies of the RF signals, the amplitudes and phases of each deflected sub-pulse beams are controlled by the amplitudes and phases of the sound wave decided by those of the RF signals at the corresponding frequencies; the optical lens system comprises a wide-angle collimation lens to collimate multi-angle sub-pulse beams from the acoustic-optical device into parallel beams by converting angular difference from acoustic-optical device output into transverse displacements, while ensuring weak focusing of each beams, so as to improve a response bandwidth of retro-diffraction at the grating interface; the grating is positioned near focal planes of weakly focused sub-pulse beams, the orientation of the grating is optimized to ensure retro-diffraction of a negative first order to optimally overlap with an incident direction, the transverse displacement of each sub-pulse beams leads to optical path length difference during the retro-diffraction, leading to relative optical delays among the retro-diffracted sub-pulses, wherein the relative optical delays are determined by a focal length of the optical lens system and the deflection angles of the acoustic-optic device, and are controlled by the frequency of the RF signal; each retro-diffracted sub-pulse passes through the wide-angle collimation lens and the acoustic-optical device again, wherein the grating diffraction occurs near a Gaussian optical waist of each beam, the retro-diffraction generates approximately time-reversed wavefront for each beam, which ensures that for each beam diffracted twice by the same sound wave ends up with output direction to be the reversed direction of the original incident pulse, with an overall diffraction efficiency insensitive to the sub-pulse delay, resulting in recombination of all the sub-pulse beams into an incident beam path, and along a reversed direction to be coupled into a single-mode optical device after an optical circulator as the output, any sub-pulse beams that do not follow such reversed path is blocked from entering the output; by controlling inter sub-pulse delays, amplitudes and phases of the sub-pulses, nearly arbitrary waveforms within an input pulse bandwidth and total delay are synthesized by the sub-pulse sequence, by programming the RF waveforms; and the frequency-stabilized laser system monitor is configured to detect the amplitudes and phases of the sub-pulse sequence in real time and to provide feedback for stabilizing a waveform from the output.

The present disclosure relies on multi-frequency acoustic-optic deflection (AOD) and retro-diffraction based multi-delay generation, to coherently stack multiple sub-pulses, with high-speed programmable delays, amplitudes and phases, so as to synthesize the output waveform into the desired shape in the time domain as a single-mode optical output. The pulse shaping method bridges the outlined bandwidth-duration regime not conveniently supported by previous methods, and provides a powerful means to convert a mode-locked laser into a rapid-programmable precise optical waveform generator which combines high speed with strong spectral brightness. The present disclosure is expected to have important application for rapid quantum control of optical transitions in atomic/molecular before spontaneous emission occurs, with widely expected applications in the field of laser cooling, atom interferometry, and many other laser-based atomic physics researches.

Specific steps of the present disclosure are as following:

An incident mode-locked laser pulse, typically a picosecond pulse with transform-limited spectral width, is deflected by an acoustic-optical deflector into multiple directions through Bragg diffraction-based multi-frequency acoustic-optic deflection.

A large field-of-view, long working distance collimation lens system converts the multi-angle deflected beams into parallel but transversely displaced beams, while also ensure each beam is weakly focused onto a large-area grating centered at the focal plane of the lens system;

Efficient retro-diffraction of the multiple weakly focused light beams, within their Rayleigh range $z_R$, ensure their approximately time-reversed propagation after the transverse-displacement-dependent delays, back through the lens system for a second acoustic-optical deflection;

The approximate time-reversal symmetry ensures efficient acoustic-optic deflection and delay-independent efficient coupling of the final output into a single mode device (such as a polarization maintaining single mode optical fiber), where the delayed sub-pulses are coherently stacked with a delay range of up to $$\tau_{max} \sim \frac{2z_R}{c}$$

(c is the speed of light).

During the sub-pulse sequence generation, the delay, amplitude, and phase of each sub-pulse is conveniently and precisely controlled by the frequency, amplitude, and phase of the corresponding RF signal that drives the acoustic-optic deflection.

The multi-angle acoustic-optic deflection efficiency, including both the amplitude and phase, can be monitored in real time by injecting a continuous wave (CW) laser to the same pulse shaping system and to monitor the beat note with a reference CW path. This reference path does not need to be phase-stable, since it is the relative phases among the multi-frequency beats, which are due to multi-angle AOD deflections, are of the importance. In this way, any drift of the deflection amplitude and phase can be monitored and corrected for by rapidly updating the RF signals that drive the AOD. The feedback also facilitates optimization of the AOD deflections for a best pulse energy conversion efficiency.

To summarize the functioning of the present disclosure, consider a mode-locked laser input with a pulse width r and a transform-limited spectral width of $\Delta f \approx 1/\pi\tau$, the pulse shaping system is able to shape such input pulses into a single-mode, quasi-continuous optical waveform with duration $\tau_M = N\tau_d < \tau_{max}$ and a modulation bandwidth $\Delta f_M = 1/\pi\tau_d$, through precise amplitude and phase programming of an N-sub-pulse sequence, such as with an equally spaced interval $T_d \geq \tau$. The optical waveform shall be arbitrarily shaped within a $\tau_M \times \Delta f_M$ product regime, with precise and stable waveform stability, to replace conventional optical waveform generation based on the much slower modulation of CW lasers. To give concrete numbers, consider typical mode-locked laser input with $\tau \sim 100$ femtoseconds to 10 picoseconds, waveform modulation bandwidth of $\Delta f_M \sim 30$ GHz to 3 THz can be achieved. A maximum pulse duration of $\tau_M \sim 100$ ps can be achieved with retro-diffraction from a single large-area grating. To extend the maximum delay $\tau_{max}$ in the present disclosure, the large-area grating may be replaced by a group of n distant gratings to provide retro-diffractions to sub-groups of the multiple parallel beams. The Gaussian waists of the groups are managed by additional 4-F imaging systems to ensure their nearly collimated incidence to each grating. In this way, longer delay time $\tau_{max} \sim nz_R/c$ at the nanosecond level can be achieved for GHz-level or finer quantum control frequency resolution. Optionally or alternatively, the gratings may be replaced by micro-mirror-arrays to further enhance the retro-diffraction efficiency and/or to more finely match the wavefront curvatures. The precise phase stability among the sub-grouped pulses are again monitored by CW laser beat notes measurements and to be maintained by rf signal feedbacks. The resulting arbitrarily shapeable precise optical waveforms in the specific pulse duration-bandwidth product regime should be very useful for efficient electric dipole control of atoms and molecules.

The schematic of the present disclosure is shown in FIG. 1. The system includes: an RF signal programming module 108, an acoustic-optical deflection module 103, a wide-angle collimation lens module 105, a large-area grating module 106, and a frequency-stabilized waveform monitoring module. In one implementation, the system may include a Faraday rotator 104. In another implementation, the system may include a mode-locked laser 101 with a pulse 102. In another implementation, the system may include a CW laser input 111.

In the RF signal programming module 108, a user writes frequency, amplitude, and phase of each of the N frequency components of the RF signal (the total sub-pulse number N itself is also programmable). The programmed RF signals are then combined in a power combiner 109, amplified in an amplifier 110, and transmitted to drive the acoustic-optical deflection module 103.

In the acoustic-optical deflection module 103, an acoustic-optical device (which is either an acoustic-optical modulator (AOM) or an acoustic-optical deflector (AOD)) converts multi-frequency RF signal into sound wave signal (a crystal density-modulated wave) with a list of frequencies, amplitudes, and phases, so as to induce multi-angle diffraction of an incident pulsed laser into multiple sub-pulse paths. The deflection angles between the incident and the deflected beams are proportional to the frequencies of the sound wave signal under small angle approximation, which can thus be changed quite arbitrarily by programming the frequencies of the RF signals. The amplitudes and phases of each deflected sub-pulse beams are instead controlled by the amplitudes and phases of the sound wave decided by those of the rf signals at the corresponding frequencies.

The wide-angle collimation lens module 105 collimates multi-angle sub-pulse beams from the acoustic-optical deflection module into parallel beams. The function of the long focal length collimation system is to convert the angular difference from the AOD output into sufficiently large transverse displacements, while simultaneously ensuring weak focusing of each beam, so as to improve the response bandwidth of retro-diffraction at the grating interface.

The large-area grating module 106 is positioned near the focal planes of the weakly focused sub-pulse beams. The orientation of the grating is optimized to ensure retro-diffraction of the negative first order, i.e., with the diffraction direction to optimally overlap with the incident direction. The transverse displacement of each sub-pulse beams leads to optical path length difference during such retro-diffraction, leading to relative optical delays among the retro-diffracted sub-pulses. From the above discussion, the delays are determined by the focal length of the optical lens system and the deflection angles of the acoustic-optic deflection module, and are thus controlled by the RF signal frequency programming.

Propagating backward, each retro-diffracted sub-pulse then passes through the wide-angle collimation module and the acoustic-optical deflection module again. Since the grating diffraction occurs near the Gaussian optical waist of each beam, the retro-diffraction generates approximately time-reversed wavefront for each beam, which ensures that for each beam diffracted twice by the same sound wave ends up with output direction to be the reversed direction of the original incident pulse, with an overall diffraction efficiency insensitive to the sub-pulse delay. This results in recombination of all the sub-pulse beams into the incident beam path, but along the reversed direction to be coupled into a single-mode optical device (single-mode fiber 107) after an optical circulator as the output. Any sub-pulse beams that do not follow such reversed path is blocked from entering the output.

As described above, by controlling inter sub-pulse delays, amplitudes and phases of the sub-pulses, nearly arbitrary waveforms within the input pulse bandwidth can be synthesized by the sub-pulse sequence, with a maximum delay $\tau_{max}$ limited by the Rayleigh length $z_R$ of the beams at the location of the grating module. With moderate beam waist adjustment, a maximum delay of 100 ps can easily be obtained in the single grating system. To obtain an optical delay of into nanosecond regime, the single diffraction grating may be replaced by multi-grating system 201 as shown in FIG. 2, with additional imaging system to manage the Gaussian beam waists. In this way, a transverse area of the grating within the Rayleigh range of an incident sub-beam is effectively increased to enhance the delay range to achieve the nanosecond delay. Optionally and alternatively, the gratings may also be replaced by micro-mirror-arrays to enhance the retro-diffraction efficiency and/or to more finely match the wavefront curvatures beyond the beam Rayleigh range.

The frequency-stabilized waveform monitoring module is configured to detect the amplitudes and phases of the sub-pulse sequence in real time and to perform feedback so as to stabilize the waveform from the pulse shaper output. As shown in FIG. 1 and FIG. 3, the monitoring module operates as follows: a frequency-stabilized laser (which is a continuous wave or CW laser 301) sharing the same central wavelength as the pulsed laser is injected to the pulse shaping system, passes through all the multi-delayed paths as those for the pulsed laser, and similarly undergoes twice acoustic-optic deflections, before being coupled to the same single-mode output. For the CW laser, the acoustic-optical deflection is accompanied with pronounced RF frequency shifts. The deflection amplitudes and phases can thus be measured by beating with a reference beam (306) using a heterodyning setup. Since the CW laser and the pulsed laser share the same optical path, the retrieved relative amplitudes and phases of each frequency sidebands directly reflect those of the sub-pulses coupled into the same output. The overall phase factor, which is sensitive to the reference CW beam and thus hard to maintain, is not important.

During the operation of the pulse shaping system under CW laser monitor, the cross-talks between the pulsed optical waveform outputs and the frequency-stabilized monitoring light can be avoided by adding optical switches to separate the two light fields in the time domain. As in FIG. 3, the markers (1) and (2) correspond to corresponding marks in FIG. 1, where each AOM serves as a high-speed optical switch. Through RF time sequences as exampled in FIG. 4, rapid switching between the CW monitoring light and pulsed optical waveforms at e.g. 1 MHz repetition rate can be realized. In such ways, the CW laser is only turned on in between pulsed laser gaps, and the phase and amplitude monitoring is achieved stroboscopically without affecting the pulsed waveform outputs. Laser pulse may be output at 305. As shown in FIG. 3, in one implementation, the pulse shaping system may also include a detector 307.

So far, linear response of light pulse shaping with acoustic-optical deflections is assumed. However, the acoustic-optic deflection is intrinsically a nonlinear process. When the amplitudes of the sound waves are large, the coherent signal transduction from rf to light fields becomes nonlinear too, which increases the difficulty of programming the sub-pulse amplitudes and phases directly with the rf signals. To account for the nonlinear effect, the frequency-stabilized laser monitoring module can again be used to measure the sub-pulse amplitudes and phases in real time, which should allow nonlinear optimization of the optical waveform fidelity by rapidly programming the multi-frequency RF signals.

It is important to point out that the pulse shaping scheme is passively phase stable against vibrational noise, an important advantage in any coherent pulse shaping scheme. In particular, all the sub-pulses of the present disclosure share a same set of optics, so that the relative vibration of the components, which is also the most likely cause of phase error in conventional optical modulation designs, does not change the optical path difference of each sub-pulse path. Therefore, the system possesses intrinsic short-term phase stability. Furthermore, the phase drift caused by low-frequency noise is detected through the frequency-stabilized monitoring module, with compensation performed with RF feedback, so that the long-term phase stability of the system can be accurately maintained.

The system design and control method of the present disclosure are different from the prior art. First, the multi-frequency acoustic-optic deflection technology and the grating-based retro-diffraction are uniquely combined to generate rapidly programmable multiple delay lines while supporting convenient amplitude and phase modulation during the deflection process. The approximate time-reversal symmetry in the design ensures high quality single-mode output insensitive to the pulse shaping parameters and with excellent passive phase stability. Programmable optical delays up to nanoseconds can be achieved, and the sub-pulses can be accurately and arbitrarily programmed at within microseconds to update the output waveform with sub-THz to THz bandwidth. According to the technical solution provided in the present disclosure the optical pulse shaping method based on multi-frequency acoustic-optic modulation and grating diffraction has the following advantages:

(1) According to the present disclosure, the precise control of the output pulsed optical waveform is realized through high speed digital rf-programming the number, delay, amplitude and phase of the sub-pulses. In particular, the programming updating speed is only limited by a microsecond-level acoustic-optical modulation bandwidth, which is far higher than by moving mechanical parts in an interferometer (which is at a second level) or spatial light modulator (millisecond level) commonly used in an FTPS technology.

(2) The multiple sub-pulse generation is based on multi-frequency acoustic-optical deflection, which divide an incident pulse in k-space, rather than cutting wavefront directly in real space as in the Direct Space to Time Pulse Shaping (DSTPS) technology, so as to maintain excellent single-mode quality and stability of the output insensitive to the programmed pulse shape. The method of external delay also allows delay time beyond those limited by the crystal size, as those in Acoustic Optical Programmable Dispersive Filters (AOPDF). Finally, the time-domain method allows nanosecond coherent delay which is difficult to be obtained by the Fourier transform pulse shaping (FTPS) technology.

(3) The range of optical delay from 100 picosecond (ps) to beyond nanosecond can be achieved by adjusting the AOD deflection angle, combined with wide-field lens collimation and additional 4-F system and large-area grating groups for distributed retro-diffraction. Optionally and alternatively, the gratings can also be replaced by micro-mirror-arrays to enhance the retro-diffraction efficiency and/or to more finely match the wavefront curvatures beyond the beam Rayleigh range.

(4) The grating retro-diffraction ensures approximate time-reversal symmetry for efficient double-pass to AOD, thereby ensure high-quality single-mode output of the pulse shaping system insensitive to the sub-pulse delays or the output waveforms to be synthesized.

(5) By having all sub-pulse optical paths to share a same optical setup, the whole system is with excellent passive phase stability against vibration noises.

(6) The system performance can be conveniently monitored with a CW laser to retrieve in real time the relative delays, amplitudes and phases among sub-pulses. By combining the real-time measurements with feedback control using the rf-programming, long-term waveform stability can be achieved.

To summarize, the present disclosure is designed to convert a mode-locked laser input pulse into an arbitrarily programmable optical waveform. The waveform control is implemented simply by programming the number, delay, amplitude and phase of a sub-pulse sequence without affecting the single-mode quality of the output. The waveform modulation bandwidth is beyond 10 GHz and is typically only limited by the input pulse optical bandwidth. The delay line can support nanosecond-level delays to produce precise and complex waveforms at the nanosecond-long duration. The present disclosure should certainly support high-resolution atomic/molecular multi-dimensional coherent spectra research. More importantly, the present disclosure should support high-fidelity quantum control of electric dipole transitions in atoms/molecule rapid enough before spontaneous emission occurs, by generating the tailored waveform within a duration-bandwidth regime difficult to be achieved by the prior art.

BRIEF DESCRIPTION OF THE DRAWINGS

The system, device, product, and/or method described below may be better understood with reference to the following drawings and description of non-limiting and non-exhaustive embodiments. The components in the drawings are not necessarily to scale. Emphasis instead is placed upon illustrating the principles of the disclosure.

FIG. 9 shows a flow diagram of an embodiment for an optical pulse shaping method.

Figure 1:
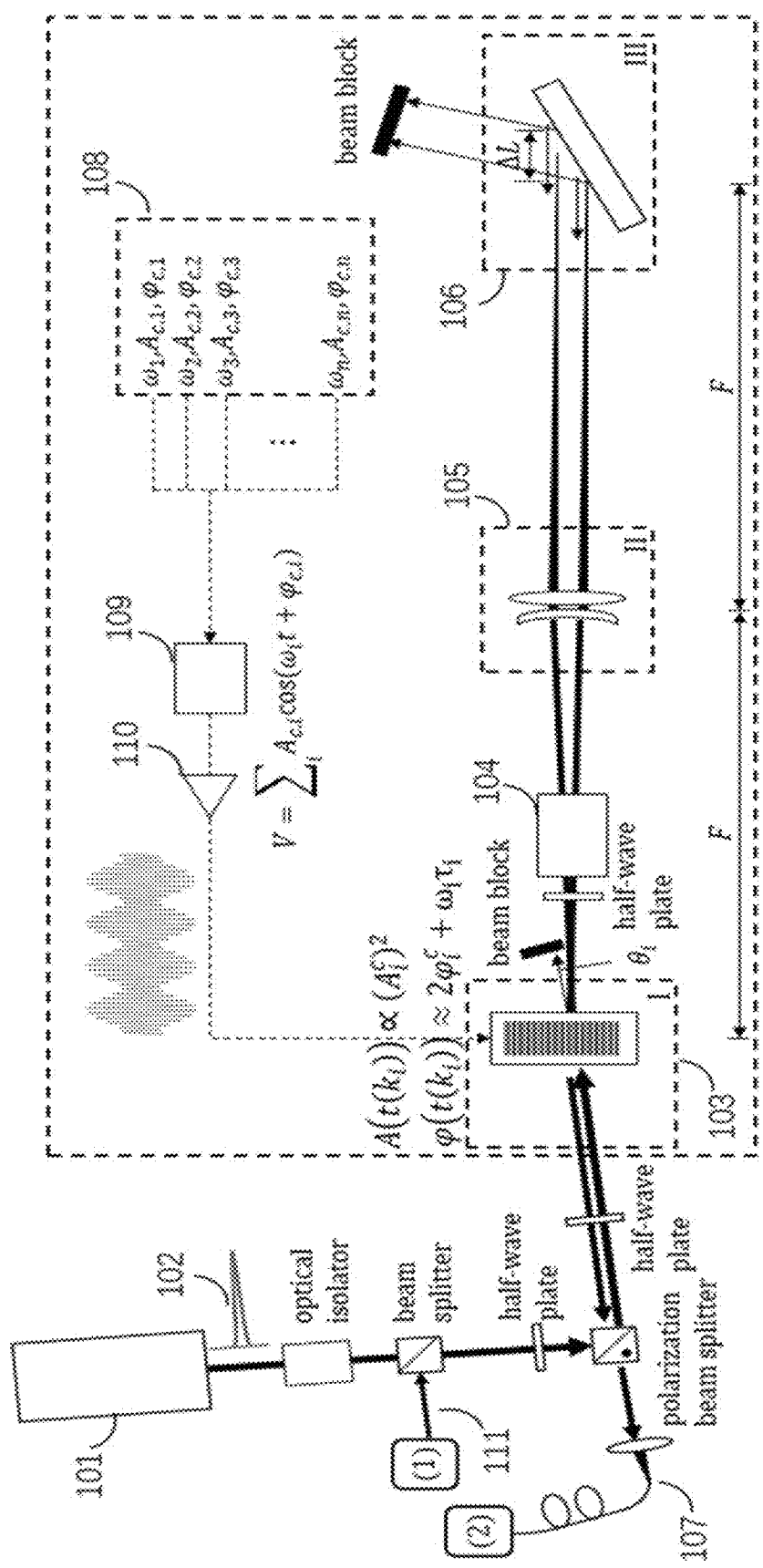
FIG. 1 is a schematic diagram of an optical pulse shaping system based on multi-frequency acoustic-optic deflection and retro-diffraction based multi-delay generation. Marks (1) and (2) correspond to subgraphs (1) and (2) in FIG. 3.

While the present invention is susceptible to various modifications and alternative forms, exemplary embodiments thereof are shown by way of example in the drawings and are herein described in detail. It should be understood, however, that the description of exemplary embodiments is not intended to limit the invention to the particular forms disclosed, but on the contrary, the intention is to cover all modifications, equivalents and alternatives falling within the spirit and scope of the invention as defined by the embodiments above and the claims below. Reference should therefore be made to the embodiments above and claims below for interpreting the scope of the invention.

DETAILED DESCRIPTION

The disclosed systems and methods will now be described in detail hereinafter with reference to the accompanied drawings, which form a part of the present application, and which show, by way of illustration, specific examples of embodiments. Please note that the systems and methods may, however, be embodied in a variety of different forms and, therefore, the covered or claimed subject matter is intended to be construed as not being limited to any of the embodiments to be set forth below. Please also note that the disclosure may be embodied as methods, devices, components, or systems. Accordingly, embodiments of the disclosed system and methods may, for example, take the form of hardware, software, firmware or any combination thereof.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. It is intended, for example, that claimed subject matter may include combinations of exemplary embodiments in whole or in part. Moreover, the phrase "in one implementation", "in another implementation", or "in some implementations" as used herein does not necessarily refer to the same implementation or different implementation. It is intended, for example, that claimed subject matter may include combinations of the disclosed features from the implementations in whole or in part.

In general, terminology may be understood at least in part from usage in context. For example, terms, such as "and", "or", or "and/or," as used herein may include a variety of meanings that may depend at least in part upon the context in which such terms are used. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes various embodiment including one or more process to generate arbitrary optical waveforms by controlling picosecond optical pulse shaping, according to the optical pulse shaping method based on multi-frequency acoustic-optic deflection and retro-diffraction based multi-delay generation. Furthermore, to illustrate the actual performance, experimental results on temporal and spectral characterization of the output waveforms are provided.

Optical pulse shaping technology plays an important role in the fields of high-precision spectroscopy research and coherent quantum control. In the field of ultrafast optics, a multi-dimensional coherence spectroscopy (MDCS) technology reveals the coherence dynamics of a sample by using multi-pulse excitation and coherent detection. For example, in 2003 and 2007, Chinese scientist Peifang Tian (from Princeton University) and American scientist Patrick F. Tekavec (from Michigan University) respectively studied the MDCS technology. MDCS requires phase-stable multi-channel tunable optical delays. In particular, high-resolution non-linear spectral analysis with interrogation time beyond picoseconds generally requires a phase-stable optical-mechanical delay line, but such mechanical delay is difficult to maintain its fast and arbitrary programmability.

On the other hand, a composite pulse technology driven by the scientific research fields of nuclear magnetic resonance and quantum computing has been applied to error-tolerant nuclear spin and quantum bit control, and it is a research frontier with emerging achievements that optimal control is implemented through microwave pulse shaping. However, compared with nearly perfect nuclear spin control, a technology of complete SU(N) optical control of discrete atomic levels with electric dipole allowed transition is still far from being perfect. To achieve such high-fidelity control with a non-uniform laser beam, a pulse shaper requires a sufficiently large modulation bandwidth of at least 10 s of GHz and a sufficiently long coherence time, so as to obtain sub-nanosecond tailored optical waveforms with sufficient spectral brightness for rapid quantum control of optical transitions in an error-resilient manner before spontaneous emission can occur. Surprisingly, this requirement is not met in the prior art. Particularly, a conventional continuous wave (CW) laser modulation technology is too slow and the modulation bandwidth can hardly reach a few hundred of MHz. On the other hand, the waveform duration in ultrafast pulse shaping is limited by short optical delays to be within picoseconds, leading to too weak spectral intensity for the desired quantum control.

Therefore, the development of a universal pulse shaping method with a modulation bandwidth beyond 10 GHz and with output waveform duration up to a nanosecond is very useful for high precision MDCS and for full quantum control of free atoms/molecules. The key of such technology is phase-stable shaping of picosecond pulses into long waveforms, and fast programmable control of the resulting waveforms. At present, there are several common ways for optical pulse shaping. For example, along the interferometric approach, an incoming optical pulse is split into sub-pulses to propagate along multiple delay lines by a multi-port optical beam splitter, being individually modulated, before the sub-pulses finally being recombined as the shaped pulse output; In an acoustic-optical programmable dispersion filter (AOPDF), different frequency components of an ultrafast pulse is wavelength-selectively diffracted by acoustic-optics with programmable diffraction amplitudes, phases, and delays. A more widely used method referred to as Fourier transform pulse shaping (FTPS) employs diffraction gratings or other diffractive devices to spatially disperse the frequency components of an input pulse, apply the phase and amplitude modulation to each component, before another diffraction to recombine the pulse out. Finally, a direct space-to-time pulse shaping (DSTPS) technology spatially divides the wavefront of the incoming beam into sub-beams to propagate along different delay lines with individually programmable amplitude and phase modulation. Among the methods, the Fourier transform pulse shaping technology, developed primarily by Andrew M. Weiner of Purdue University, is the most widely used in ultrafast pulse shaping technologies at present. In addition to the application in multi-dimensional spectroscopic research, such a pulse shaping method has also been applied to two-photon transition and non-linear Raman spectroscopy, such as by Yaron Silberberg et al in the quantum control of optical optimization.

However, it is found from researches that there are at least the following disadvantages of the above pulse shaping technologies for generation of the optical waveforms at the desired bandwidth-duration regime outlined above:

1. For the interferometry method, the maximum relative delay between the sub-pulses is determined by the interferometry upon the path construction and is thus fixed. Consequently, the delays cannot be rapidly programmed or controlled. Therefore, strictly speaking, the interferometry method cannot be considered as a universal pulse shaping method, and can hardly support the general quantum control applications outlined above.

2. For AOPDF, the maximum delay time is limited by the crystal size. Such devices on the market at present typically provide a delay time less than 10 ps only, while any improvements are expected to be very expensive.

3. The FTPS technology relies on wavelength dispersion of optical pulse to be shaped. Therefore, it is not suitable to shape picosecond pulses which do not possess a broad frequency spectrum. However, picosecond pulses are essential to provide the necessary spectral brightness for control narrow optical transitions. Furthermore, since the pulse is modulated in the frequency domain with a spatial light modulator, to obtain a long optical delay would require spatial modulation at a high spatial frequency, which is generally difficult (and expensive) to achieve in any phase-stable manner. Finally, it is quite inevitable that the high spatial frequency modulation leads to unwanted diffraction of light, resulting in reduction of the output efficiency. This problem is referred to as a spatial-temporal coupling loss.

4. Although comparing with the FTPS technology, the DSTPS technology is more suitable for shaping a narrow-bandwidth laser pulse and to create a relatively long optical delay, a spatial wavefront division can severely affect single mode quality of the output including its stability. Furthermore, it is difficult to maintain the shaping efficiency if the waveform needs to be composed of isolated sub-pulses at a low duty cycle, since it would require most of the input beam wavefront to be blocked from the output.

Referring to FIG. 9, the present disclosure describes an embodiment of an optical pulse shaping method based on multi-frequency acoustic-optic modulation and retro-diffraction based multiple optical delay line generation. The optical pulse shaping method may include a portion or all of the following steps.

Step 910: performing, by an acoustic-optic deflector, deflection of an incident mode-locked laser beam into a multiple-directions through Bragg diffraction-based multi-frequency acoustic-optic deflection.

Step 920: converting, by a lens combination, an array of multi-direction diffraction beams into an array of weakly focused parallel beams, and transmitting the array of weakly focused parallel beams incident on a grating.

Step 930: performing, by the grating, retro-diffraction of the parallel beam array within their Rayleigh range $\tilde{z}_R$ leading to a second pass through the lens combination and a secondary acoustic-optic deflection.

Step 940: ensuring, by an approximate time-reversal-symmetry of the retro-diffraction, a high-quality space mode and a delay range up $\tau_{max} \sim 2\tilde{z}_R/c$ for all resulting sub-pulse, wherein c is a speed of light and a multi-sub-pulse output is coupled to a single-mode device with sub-pulse-parameter insensitive coupling efficiency.

Step 950: controlling, by a radio frequency (RF) signal programming device, a relative delay, an amplitude, and a phase of each sub-pulse through programming frequency, amplitude, and phase of a correspondent RF signal for driving the acoustic-optic deflector respectively.

Step 960: simultaneously detecting, by using a continuous acoustic-optic modulation beat frequency signal, a phase and an amplitude of the acoustic-optic deflected sub-pulse, correcting relative phase drift, and performing non-linear correction on diffraction efficiency through updating the RF signal.

The optical pulse shaping method based on multi-frequency acoustic-optic modulation and retro-diffraction based multi-delay generation provided by the present disclosure is described in detail, as follows:

First, an incident mode-locked laser pulse with a center wavelength of λ and with a Gaussian waist w is diffracted into multiple paths through multi-frequency acoustic-optic deflection. Specifically, a sound wave with a angular frequency of $\omega_i$ may drive the sound wave induced refractive index grating with a wavenumber $k_{s,i}=\omega_i/v_s$ ($v_s$ is a crystal sound velocity) inside the acoustic-optical crystal. The incident light wave vector $k_{in}$ may thus be shifted to $k_{out,i}=k_{in}+k_{s,i}e_y$, near the Bragg deflection condition, to generate multiple output paths with deflection angles $\theta_i=\omega_i\lambda/v_s$ ($e_y$ is a unit vector along the y direction). For multi-frequency sound waves of i=1, ..., N, incident light is split into multiple directions specified by $\theta_i$.

Following the multi-angle deflections, a wide-field collimation lens system converts the angularly divergent paths into parallel paths of weakly focused beams. Well-established optical techniques allow the wide-field lens system to be conveniently constructed with spherical lens combinations. With the incident Gaussian beam of w, and an effective focal length of the lens group to be F, the center position of parallel beams after passing through the lens group is $y_i$=sin $\theta_i$ F with a re-imaged Gaussian waist $\tilde{w}=\lambda F/\pi w$ and a Rayleigh length $\tilde{z}_R=\Delta F^2/\pi w^2$.

Retro-diffraction is performed on all multi-path parallel beams at the center position $y_i$ in the Rayleigh range $\tilde{z}_R$ of the focused Gaussian beam by using a large-area grating (a grating constant is d), to implement an optical delay $\tau_i$ that is directly proportional to $2y_1/c$ (c the speed of light) and of which a delay range is close to $\tau_{max}=2\tilde{z}_R/c$. A specific expression of the optical delay is:

$$\tau_i = \frac{\omega_i \lambda}{v_s} \frac{F}{\pi c \sqrt{4d^2/\lambda^2 - 1}} \qquad \text{(Equation 1)}$$

Finally, the retro-diffracted laser passes through the lens group again and enters the acoustic-optic deflector system for a $2^{nd}$ time. Due to time reversal symmetry of the retro-diffracted light, efficient deflection with $k_{out}=-k_{out,i}+k_{s,i}e_y=k_{in}$ emerges at the deflector output as a $\theta_i$-independent, high-quality single-mode output, which can be coupled to a single-mode device after it is separated from the input with a Faraday rotator.

The frequency, amplitude, and phase $\{\omega_i, A_{c,i}, \varphi_{c,i}\}$ of a radio frequency (RF) signal are controlled by programming, the frequency, amplitude, and phase $\{\omega_i, A_{s,i}, \varphi_{s,i}\}$ of a sound wave signal are precisely controlled, and thus the delay, amplitude coefficient, and phase $\{\tau_i, A_i, \varphi_i\}$ of an optical sub-pulse are precisely controlled. In addition to the relationship $\omega_i \sim T_i$ described in the Equation 1, the amplitude conversion coefficient and a phase transfer function are summarized as follows:

$$A_i = \eta A_{c,i}^2 + \delta A_i(\{A_{c,j}, \varphi_{c,j}\}) \quad \text{(Equation 2)}$$

$$\varphi_i = 2\varphi_{c,i} + \omega_i \tau_i + \delta\varphi_i(\{A_{c,j}, \varphi_{c,j}\}), \quad \text{(Equation 3)}$$

where, $A_i \approx A_{c,i}^2$, and $\varphi_i \approx 2\varphi_{c,i} + \omega_i \tau_i$ are small signal approximations ($\eta_i$ is a conversion coefficient) based on secondary acoustic-optic modulation, and $\delta A_i(\{A_{c,j}, \varphi_{c,j}\})$, $\delta\varphi_i(\{A_{c,j}, \varphi_{c,j}\})$ are counted into a high-order non-linear contribution $k_j$ during the rf-acoustic-optic transduction process. In an actual programming operation, a non-linear contribution of $A_i(\{A_{c,j}, \varphi_{c,j}\})$, $\delta\varphi_i(\{A_{c,j}, \varphi_{c,j}\})$ may be suppressed by limiting the diffraction efficiency $A_i \approx \eta A_{c,i}^2$ within the linear regime. Alternatively, non-linear correction may be performed to optimize the amplitudes and phases toward a target optical waveform, by adjusting RF signal parameters $\{A_{c,i}, \varphi_{c,i}\}$ through real-time beat frequency measurement (using the frequency-stabilized waveform monitoring module as described below).

Figure 3:
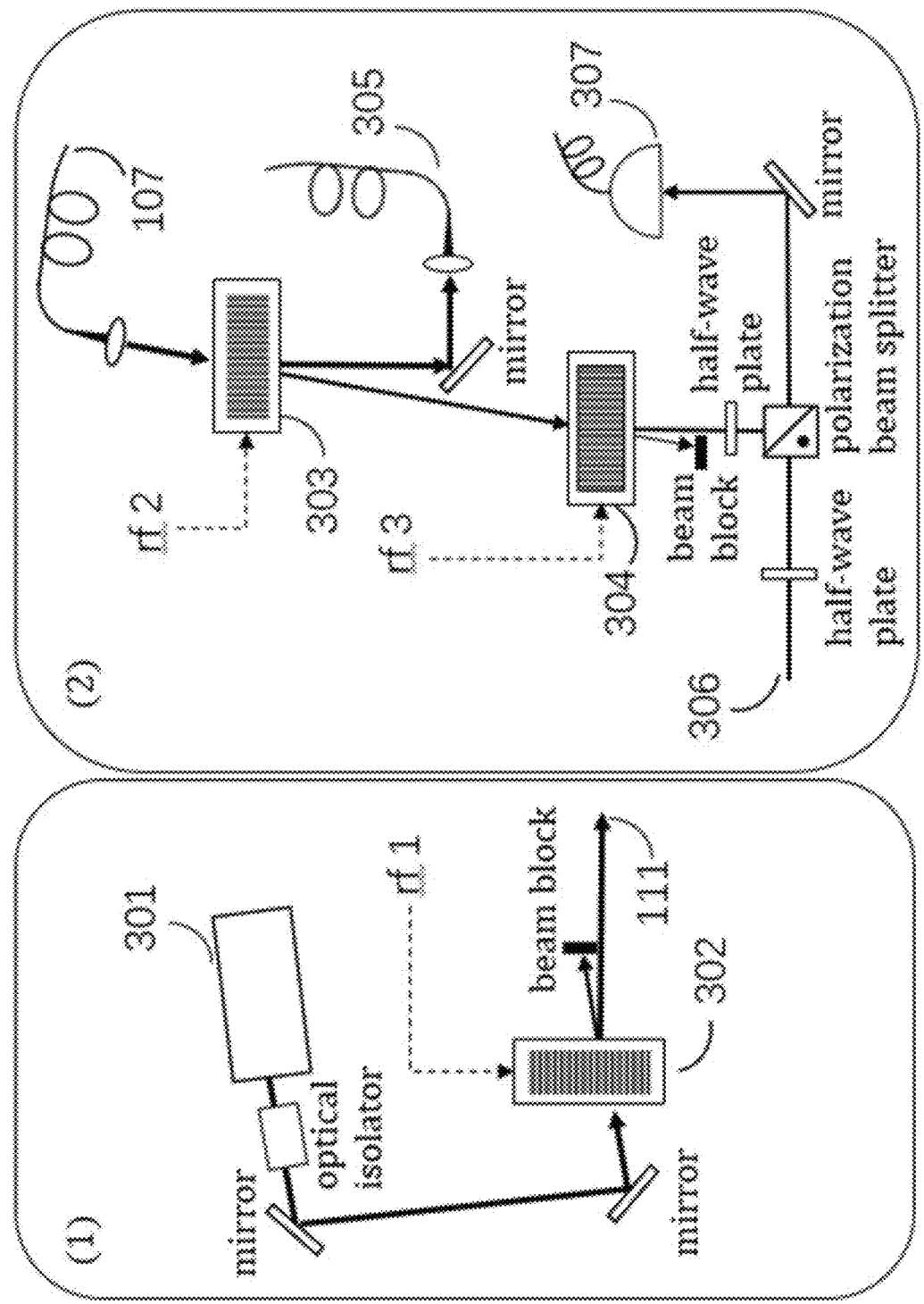
FIG. 3 is a schematic diagram of a frequency-stabilized laser monitoring module. (1) is a schematic diagram of a frequency-stabilized laser input end and (2) is a schematic diagram of a frequency-stabilized laser output end for time-domain separation and monitoring of pulsed waveform outputs.

Meanwhile, a frequency-stabilized laser with the same wavelength may be injected along with the incident pulse, to monitor the phase and deflection/diffraction efficiencies of the pulse along the multi-delay lines. Specifically, the amplitude $A_i$ and the phase $\varphi_j$ of a delay pulse are measured by monitoring the amplitude $A_{p,i}$ and the phase $\varphi_{p,i}$ of beat note signal between the CW output and a reference laser, utilizing the $2\omega_i$ frequency shift offered by the acoustic-optic deflection. Since the optical path experienced by the frequency-stabilized laser completely coincides with an optical path of a pulsed laser in space, there are definitely $A_{p,i} \propto A_i$, and $\varphi_{p,i} = \varphi_i +$ a constant offset. The phase offset introduced by the reference laser does not affect the relative phases between sub-pulses, so the beat note measurement, as by FIG. 3, is rather easy to set up to monitor in real-time the $\{A_i, \varphi_i\}$ and compare the values with set values. Non-linear corrections may be performed to optimize $\{A_i, \varphi_i\}$ by adjusting the RF parameters $\{A_{c,i}, \varphi_{c,i}\}$ at the same time when the long-term stability of the phase and the amplitude of the pulsed optical path are ensured.

Figure 4:
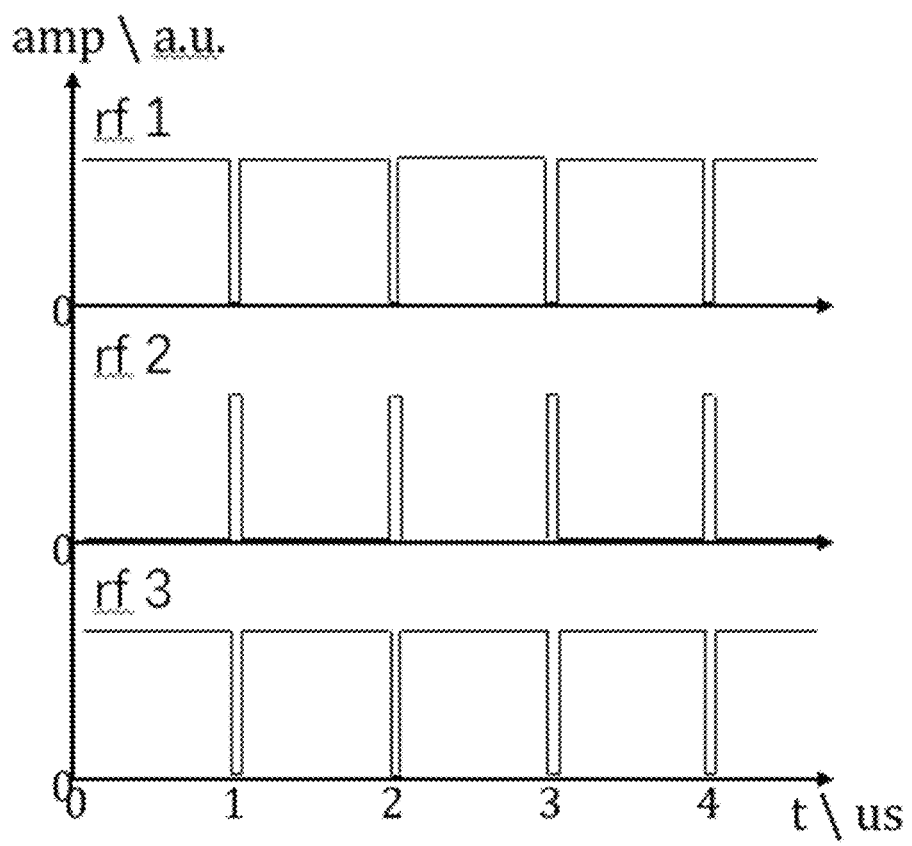
FIG. 4 shows an example of RF sequence for time-domain separation of monitoring laser and pulsed optical waveform outputs, so as to suppress the cross-talk. The same "rf 1", "rf 2", and "rf 3" are marked as those in FIG. 3.

As in FIG. 4, for the monitoring module, an additional optical switch may be added to implement time-domain separation of the frequency-stabilized laser and the pulsed laser in the single-mode output, to avoid mutual interference between the frequency-stabilized laser and the pulsed laser in their respective measurements and applications.

For the system using grating retro-diffraction, a maximum delay time $(\tau_d)_{max}$ and an associated frequency resolution $(\delta f_L)_r = 1/(\tau_d)_{max}$ are limited by the overlapping efficiency of perfectly time-reversal wavefront and the retro-diffracted wavefront by a plane grating. Retro-diffraction is efficient only within the Rayleigh range $\tilde{z}_R = \pi \tilde{w}^2/\lambda$. of the focused Gaussian beam. Therefore, the maximum delay time is $(\tau_d)_{max} = 2\tilde{z}_R = 2\pi \tilde{w}^2/\lambda$.

For an input pulse with an optical bandwidth of $\delta f_L^{in}$, retro-diffraction off the grating interface further limit the output optical bandwidth with $\delta f_L^{out} < (\delta f_L)_{max}$, with $$(\delta f_L)_{max} = c\sqrt{\frac{4d^2}{\lambda^2} - 1} \Big/ (\tilde{w}\lambda)$$

to be determined by the duration of the pulse interacting with the grating. Therefore, the bandwidth limit of a shaped waveform output is given by $\delta f_L^{out} = \min(\delta f_L^{in}, (\delta f_L)_{max})$.

Figure 5:
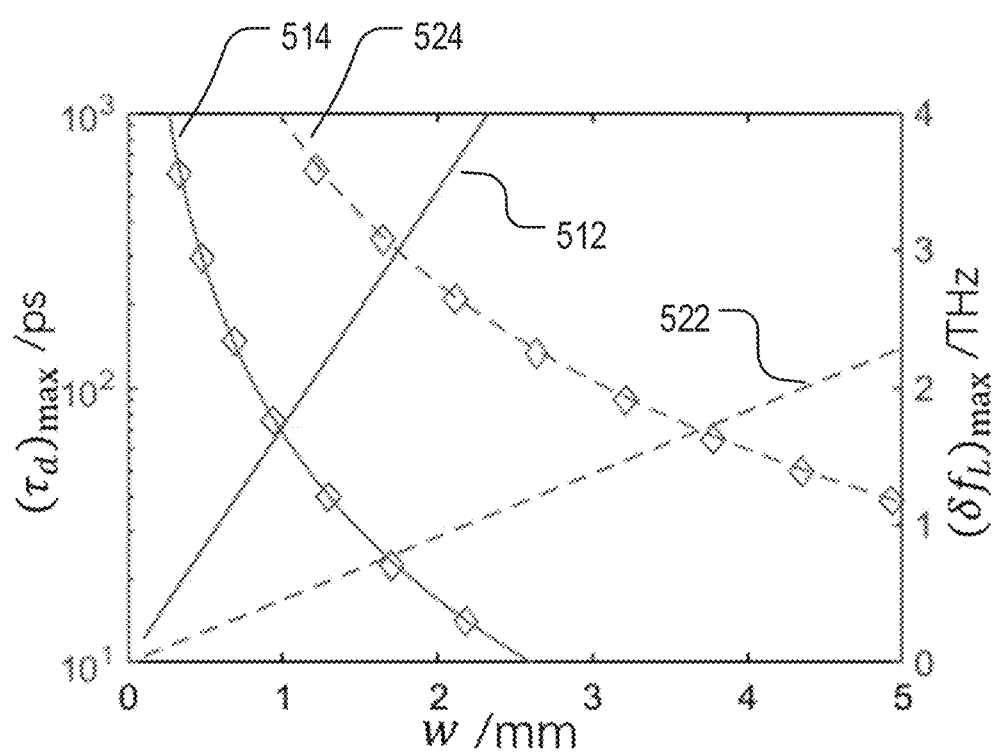
FIG. 5 gives typical maximum optical bandwidth $(\delta f_L)_{max}$ and maximum delay time $(\tau_d)_{max}$ for the pulse shaping system, as a function of the input beam Gaussian waist w. In this example the laser central wavelength $\lambda=0.8$ μm, and the grating constant d=1 mm/2400=0.42 μm. The solid lines (512 and 514) correspond to a lens focal length F=200 mm, while dashed lines (522 and 524) corresponds to F=750 mm. Lines with blocks (514 and 524) and lines without blocks (512 and 522) represent delay time $(\tau_d)_{max}$ and maximum optical bandwidth $(\delta f_L)_{max}$, respectively. Optionally and alternatively, the grating can also be replaced by micro-mirror-arrays to enhance the retro-diffraction efficiency for laser with even higher bandwidth.

As an example, FIG. 5 shows curves of the $\tilde{w}$-limited $(\delta f_L)_{max}$ and $\tilde{z}_R$ limited $(\tau_d)_{max}$ vs the Gaussian beam waist radius w of the input pulse laser, under typical additional experimental parameters. In FIG. 5, lines (512 and 522) are curves of the $\tilde{w}$-limited $(\delta f_L)_{max}$ vs the Gaussian beam waist radius w of the input pulse laser; and lines with diamond symbols (514 and 524) are curves of the $\tilde{z}_R$-limited $(\tau_d)_{max}$ vs the Gaussian beam waist radius w of the input pulse laser. In FIG. 5, solid lines (512 and 514) are for the case with the lens focal length F=200 mm, and dashed lines (522 and 524) are for F=750 mm. The incident laser center wavelength is $\lambda$=0.8 um, and the grating constant is d=1/2400=0.42 mm.

Figure 2:
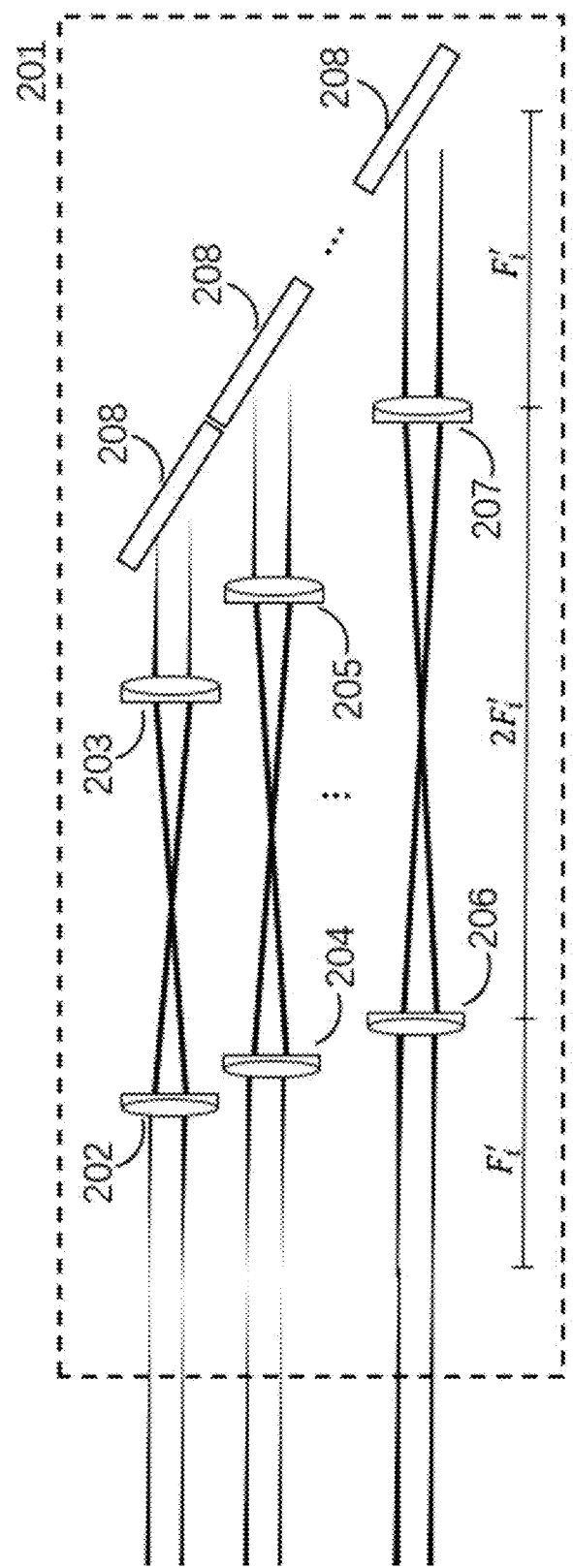
FIG. 2 is a schematic diagram of a distributed retro-diffraction system with 4-F imaging optics-based beam waist managements for achieving long range of optical delay.

The maximum delay time $\tau_{max}$ is limited by a grating area and a Rayleigh length in a single-side grating diffraction system. A delay range $\tau_{max}$ is increased by using a plurality of groups (n paths) of 4F imaging systems and reverse diffraction of a plurality of gratings (e.g., one or more 280 s) as shown in FIG. 2, and a nanosecond or longer delay range $\tau_{max} \sim 2n\tilde{z}_R/c$ may be implemented, to obtain a GHz-level or finer quantum control energy resolution. Each group of the 4F imaging system and reverse diffraction may include two lenses separated by 2F and a grating disposed at F distance away from the closer lens. For example, one group of the 4F imaging system and reverse diffraction may include two lenses (202 and 203) and a grating 208; another group of the 4F imaging system and reverse diffraction may include two lenses (204 and 205) and a grating 208; and another group of the 4F imaging system and reverse diffraction may include two lenses (206 and 207) and a grating 208.

In the following, feasibility of the present disclosure may be verified through experimental tests, by using the optical pulse shaping system based on multi-frequency acoustic-optic deflection and grating diffraction as shown in FIG. 1 as an example.

In the experiment, an acoustic-optic deflector is a simple acoustic-optic modulator (AOM) with a center modulation frequency of 80 MHz, a bandwidth about 20 MHz, and a sound velocity of $v_s$=4200 m/s. The lens system may include an achromatic lens with a focal length of F=750 mm and a diameter of D=50 mm, and optionally, may include a W=50 mm holographic grating with 2400 line/mm with grating constant d=0.42 mm. The input mode-locked laser pulse is of a center wavelength $\lambda$=795 nm, with a repetition frequency $f_0$=80 MHz, a half-height pulse width $\tau \approx 11$ ps, and a Gaussian beam waist size w=1.5 mm.

Figure 6:
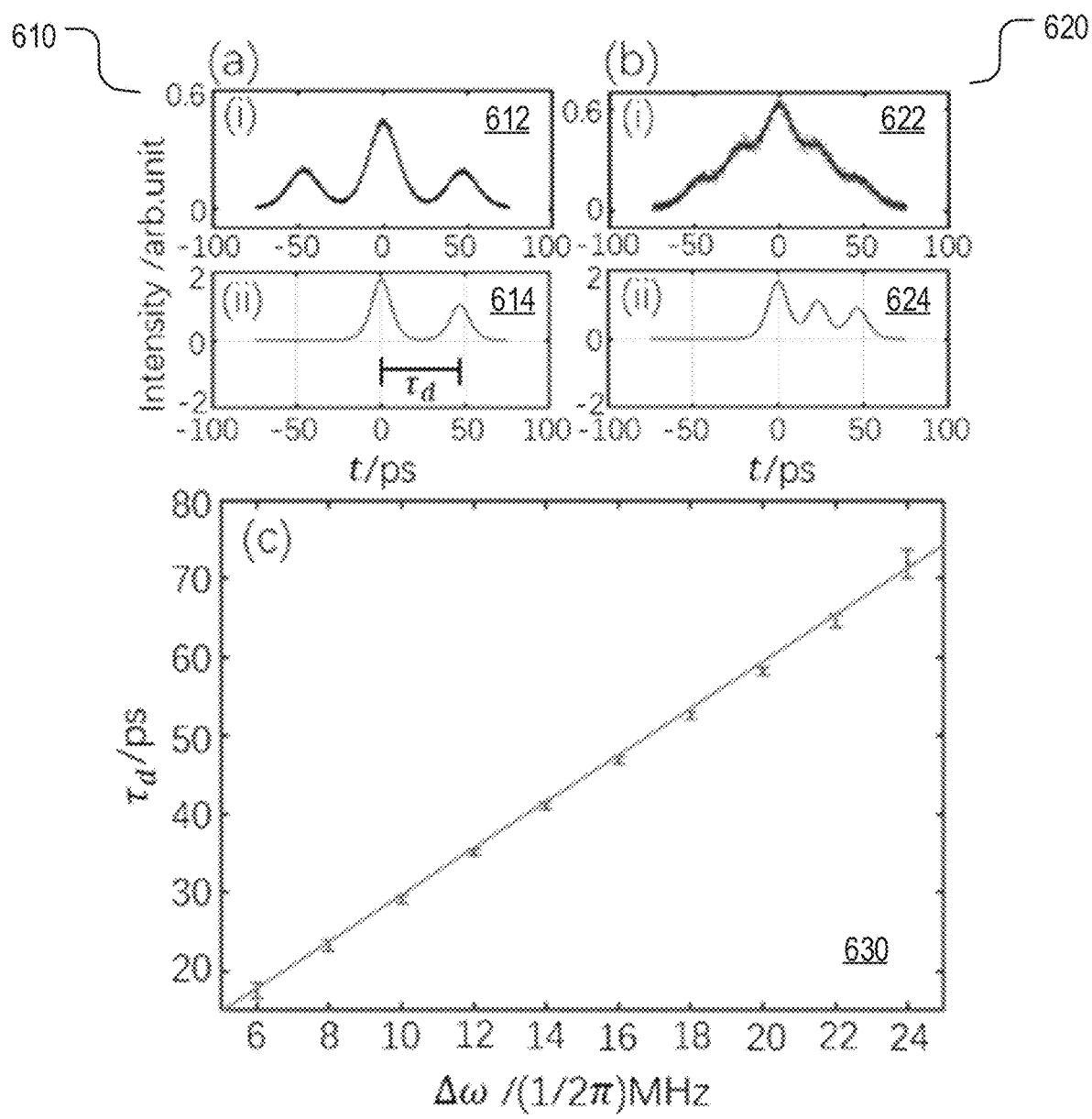
FIG. 6 shows one or more chart describing results based on one or more embodiment in the present disclosure.

FIG. 6 shows a test result of a relationship between a delay of sub-pulse sequences and a frequency of an inputted RF. Herein, output pulses are measured by using an autocorrelator under N=2, 3 sub-pulses. FIG. 6 shows test results of an autocorrelator under 2 and 3 sub-pulses. Charts 610 show autocorrelation measurement and pulse shape reconstruction in the case of 2 sub-pulses, $\omega_{1,2}=2\tau \times 76$, 92 MHz. Charts 620 show autocorrelation measurement and pulse shape reconstruction in the case of 3 sub-pulses with $\omega_{1,2,3}=2\pi \times 76$, 84.92 MHz. Chart 630 demonstrates the liner dependence between the 2-pulse delay with the AOD rf frequency difference in the case of two sub-pulses.

Points in charts 612 and 622 in FIG. 6 are data of the autocorrelator, lines are fitting curves, charts 614 and 624 are reconstructed time-dependent sub-pulse intensity. Points in chart 630 are sub-pulse delays retrieved for the case of 2-pulses at different AOD frequency differences. The error bar represents fitting errors, while the straight line is the theoretical relationship calculated according to the Equation 1, without adjustable parameters.

Charts (612 and 622) show autocorrelation curves for two and three sub-pulses. The autocorrelation data are fitted to recover the pulse shapes, as shown in charts (614 and 624) respectively. The relative delay $\tau_d$ between the sub-pulses is then obtained. Points in chart 630 provide delays corresponding to RF frequency differences of 10 groups of two sub-pulse measurements. The solid line is according to the delay-frequency relation by the Equation 1 under the setting of experimental parameters, and the error bars represents fitting errors for each data point. Due to limited temporal range of the autocorrelator, the sub-pulses with even longer delay may not directly measured. But within the measurement range, the experimental data points are in excellent agreement with the theoretical calculation (line).

Figure 7:
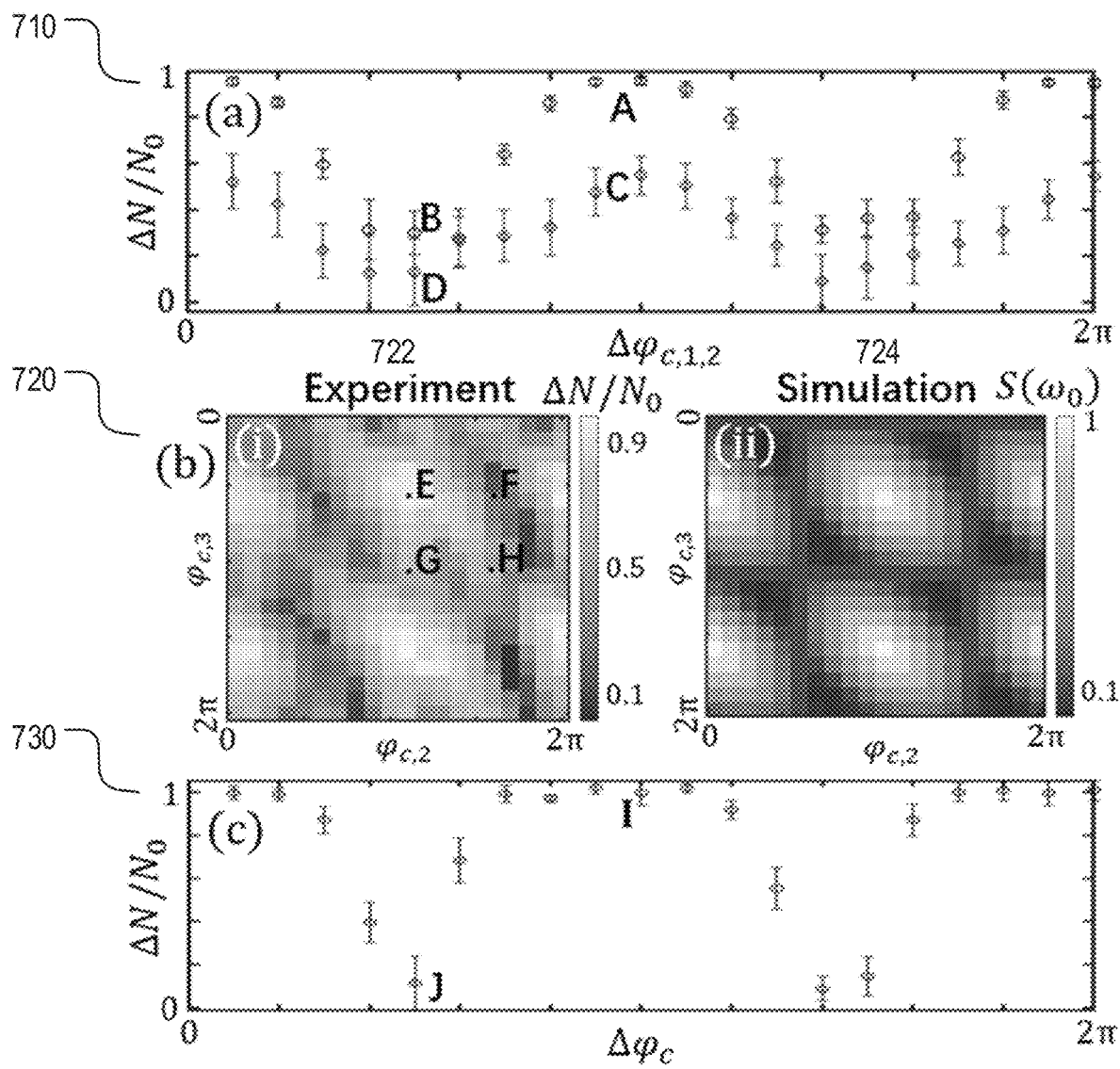
FIG. 7 shows atomic trap loss spectroscopy under excitation of optical waveforms composed of N=2, 3, and 6 sub-pulse sequences.

FIG. 7 shows cold atom capture loss spectroscopy for two, three and six sub-pulse sequences. Chart 710 shows the case of N=2, with "block" symbol for delay $\tau_d$=96 ps and "circles" for delay $\tau_d$=24 ps. Two images in 720 shows the case of N=3 with relative delay between two adjacent sub-pulses to be $\tau_d$=24 ps. Chart 730 shows the case of N=6 with relative delay between two adjacent sub-pulses to be $\tau_d$=12 ps.

Figure 8:
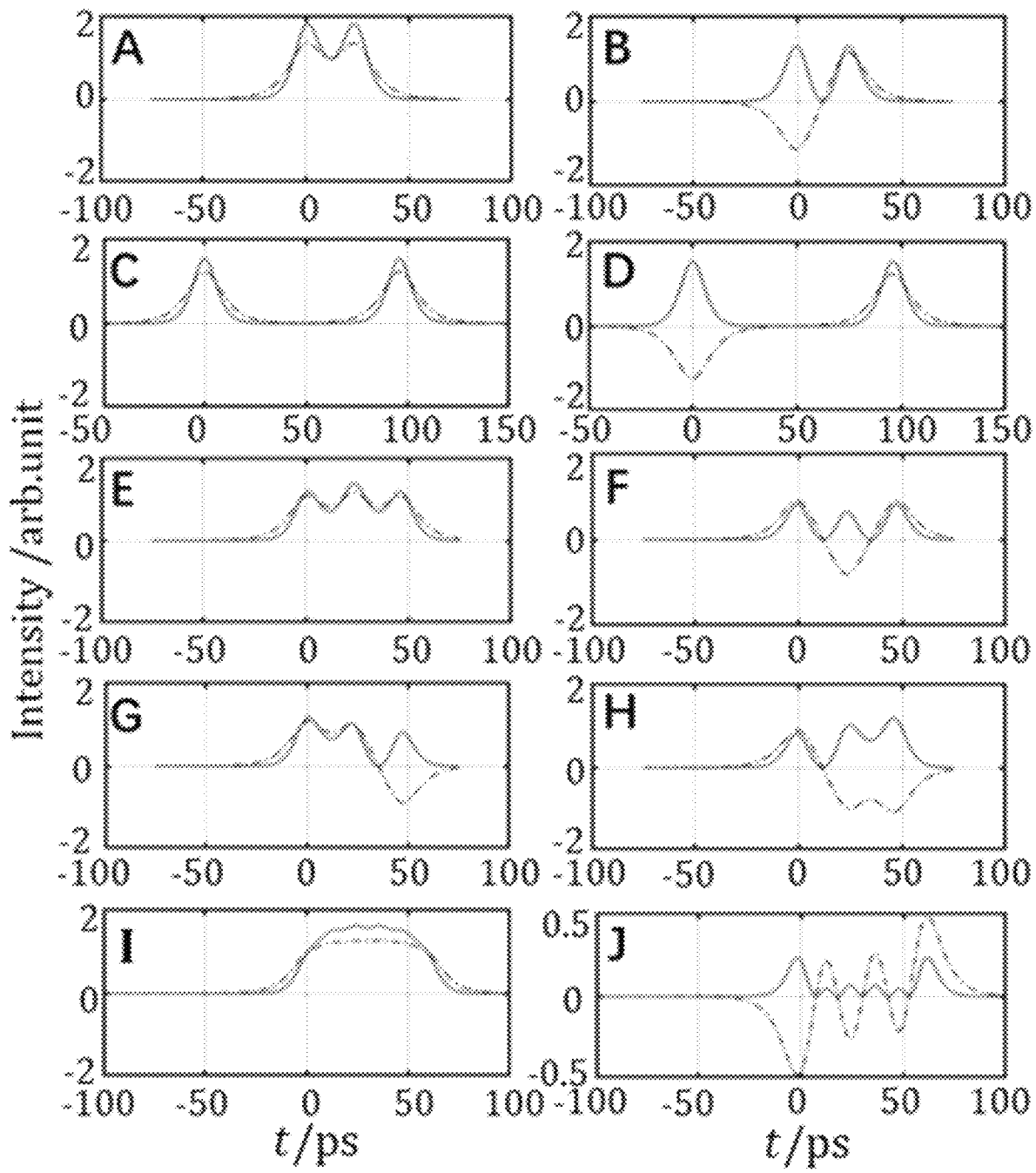
FIG. 8 illustrates reconstructed output waveforms by sub-pulse sequence with different phases. The marks "A" to "J" correspond to the corresponding marks in FIG. 7. In the figure, the solid lines represent pulse intensity $|E|^2$ while dashed lines represent real part of the complex electric field waveform Re [E] at carrier frequency equal to that of the atomic transition.

Herein, a cold atom system may be considered as a high-precision (MHz-level) spectrometer. For light resonant to atomic transition, the atomic response is maximized, leading to large reduction of atom number for the sample confined in an optical trap. Due to the delay between the sub-pulses, interference fringes in the frequency domain. The light power of the shaped optical waveform at the specific atomic transition frequency can thus be tuned by varying the relative phase between sub-pulses, so as to be detected by the cold atom system. Chart 710 shows a relative loss $$\frac{\Delta N}{N_0}$$

of the confined atoms vs the relative phase difference $\Delta\varphi_{c,1,2}$ of a scanned RF signal under N=2 sub-pulses (block markers represent the experimental test under the condition of $\tau_d$=96 ps delay, and circular markers represent the experimental test under the condition of $\tau_d$=24 ps delay). The error bar represents uncertainty of the quantity of atoms obtained from multiple measurements. The experimentally measured $$\frac{\Delta N}{N_0}$$

follows $\sin^2(\Delta\varphi_{c,1,2})$ with a relative phase of RF, which verifies the Equation 3. Further, the phase control may be tested for under N=3 sub-pulses (delay $\tau_d$=24 ps), fixed the RF phase as $\varphi_{c,1}$=0, and scanned the RF signal $\varphi_{c,2,3}$ from zero to $2\pi$ in 2D. An image 722 shows $$\frac{\Delta N}{N_0}$$

under such 2D phase scanning. For comparison, an image 724 shows an image of $S(\omega_0) \sim \sin^2(\Delta\varphi_{c,1,2}) + \sin^2(\Delta\varphi_{c,2,3}) + \sin^2(\Delta\varphi_{c,3,1})$ is simulated, the latter form can be calculated by the Equation 3, and the two figures have basically the same structure. In chart 730, $$\frac{\Delta N}{N_0}$$

with the relative phase change under N=6 sub-pulses (delay $\tau_d$=24 ps of two adjacent sub-pulses) is measured. For convenience of display, a scanning phase may be set as $\varphi_{c,1,3,5} = \varphi_{c,2,4,6} + \Delta\varphi$, and $\varphi_{c,1,3,5}$ a phase with a maximum loss of atoms (that is, marked "E" in the image 722). It can be seen from the measurements that for $\Delta\varphi$=0, $\pi$, the atom loss is enhanced and suppressed, as expected. More detailed study on the atomic spectroscopy may verify the highly stable waveforms. It is worth mentioning that the above test was made during a 6 hour measurement, indicating that the system has high passive phase stability. Sub-pulse sequences may be simulated and reconstructed in time domain in FIG. 8, where marks A-J correspond to the phases at the corresponding marks in FIG. 7. In addition to such results, the amplitude of each sub-pulse can be controlled by adjusting the amplitude of the corresponding RF signal, which has been verified for many times and are not shown herein.

This present disclosure describes a pulse shaping method that accurately converts short laser pulses into arbitrarily programmable optical waveforms with much longer duration. The shaper operates in the time domain by coherently stacking multiple sub-pulses with individually tunable amplitudes, phases, and delays. The method is based on rapidly programmable multi-frequency acoustic-optic deflection, wide-field collimation, and position-dependent delay generation. Specifically, an incoming laser pulse with temporal duration r is diffracted by a multi-frequency-driving acoustic-optical deflector (AOD) to propagate along an array of paths with different deflection angles. The AOD is positioned at the incoming focal plane of a wide-field lens with focal length F, to convert the path array into being parallel, and to reposition the Gaussian waists of the diffracted beams to the other focal plane. A high-density grating centered at the focal plane retro-diffracts all the parallel paths into their time-reversed paths to meet at the AOD again after a position-dependent delay. The output of the double-passed AOD is efficiently coupled into a single-mode device as the shaper output, with $B\propto 0.3/\tau$ optical bandwidth limited by that of the transform-limited input pulse, and with duration $\tau_d \gg \tau$ limited by the position-dependent delay. Within the $B \times \tau_d$ product, the output waveform is arbitrarily programmable by controlling the amplitude, phase and delay of sub-pulse through radio frequency (RF) programming the multi-frequency AOD operation. Using mode-locked laser pulses with $\tau$ of 0.1~10 ps as inputs, output waveforms with up to nanosecond duration $\tau_d$ and with modulation bandwidth B between 30 GHz to 3 THz shall be obtained. This present disclosure includes methods to operate the shaper for generating waveforms with long duration at the efficiency limit, and to interferometrically stabilize the output waveform over long time. By converting a mode-locked laser into a high-resolution optical waveform generator, this present disclosure enables fast and precise control of atoms and molecules in a way not previously possible with CW or ultrafast lasers. The present disclosure should thus have important applications in the fields of nonlinear and quantum optics, particularly for laser cooling, atomic interferometry and laser-based atomic isotope selections.

In summary, the present disclosure describes an optical pulse shaping method based on multi-frequency acoustic-optic modulation and retro-diffraction based multiple optical delay line generation, wherein precise high-speed programming control on amplitudes, phases, and delays of a picosecond ultrashort sub-pulse sequence is implemented, to obtain an arbitrary waveform optical pulse with a near-THz bandwidth and a coherence time up to nanoseconds, for applications in quantum control of atomic/molecular optical transition. the optical pulse shaping method includes a portion or all of the following steps:

(1) performing deflection of an incident mode-locked laser beam into a multiple-directions through Bragg diffraction-based multi-frequency acoustic-optic deflection;

(2) converting an array of multi-direction diffraction beams into an array of weakly focused parallel beams by using a long focal length and large imaging field-of-view lens combination, and making a weakly focused array of parallel beams incident on a large-area grating;

(3) performing efficient retro-diffraction of the parallel beam array within their Rayleigh range $\tilde{z}_R$ leading to a second pass through the lens combination and a secondary acoustic-optic deflection;

(4) ensuring, by an approximate time-reversal-symmetry of the retro-diffraction, a high-quality space mode and a delay range up to $\tau_{max} \sim 2\tilde{z}_R/c$ for all resulting sub-pulse wherein c is the speed of light, a multi-sub-pulse output is then coupled to a single-mode device with sub-pulse-parameter insensitive coupling efficiency;

(5) in the process, controlling the relative delay, amplitude, and phase of each sub-pulse through programming frequency, amplitude, and phase of a correspondent radio frequency (RF) signal for driving the acoustic-optic deflection respectively; and (6) simultaneously detecting phase and amplitude of the acoustic-optic deflected sub-pulse in real time by using a continuous acoustic-optic modulation beat frequency signal, correcting relative phase drift in real time, and performing non-linear correction on the diffraction efficiency, through the RF signal updates.

The optical pulse shaping method may further includes considering a mode-locked laser input with a pulse width of $\tau$ and a Fourier transform-limited spectral width of $\Delta f=1/\pi\tau$, supports a quasi-continuous output optical waveform with arbitrarily adjustable amplitude/phase, wherein: the pulse width is $\tau_M=N\tau_d$, $\tau_M<\tau_{max}$ is limited to a maximum delay range, and a modulation bandwidth is up to $\Delta f_M \approx 1/\pi\tau_d$, which is implemented through precise programming of N sub-pulse sequences with an equal-interval delay $\tau_d>\tau$, and the quasi-continuous output optical waveform with the pulse width of $\tau_M=N\tau_d$, the modulation bandwidth up to $\Delta f_M \approx 1/\pi\tau_d$, and a phase-stable arbitrarily controllable waveform within the modulation bandwidth is used for replacing a conventional continuous laser modulated by low-speed modulators, and is used for implementing efficient electric dipole excitation of atoms and molecules for internal and external quantum state optimal control.

Regarding the optical pulse shaping method, a delay range $\tau_{max}$ is increased by using multiple groups (n paths) of 4F imaging systems and retro-diffraction by multiple gratings, so as to implement the nanosecond-level or longer delay range $\tau_{max} \sim 2n\tilde{z}_R/c$, for GHz-level or finer quantum control frequency resolution; and the gratings are replaced by micro-mirror-arrays to further enhance the retro-diffraction efficiency or to more finely match wavefront curvatures.

Regarding the optical pulse shaping method, in step (1), deflection of an incident mode-locked laser beam into multiple directions through Bragg diffraction-based multi-frequency acoustic-optic deflection, is to perform multi-angle diffraction on an incident mode-locked laser pulse with a center wavelength of $\lambda$, a specific process is as follows: a sound wave with an angular frequency of $\omega_i$ drives a refractive index grating with a wave number of $k_{s,i}=\omega_i/v_s$ in an acoustic-optic crystal, wherein v, is a crystal sound velocity; an incident light wave vector $k_{in}$ is shifted to $k_{out,i}=k_{in}+k_{s,i}e_y$ under an incident angle near the Bragg condition, to generate deflected light with a diffraction angle of $\theta_i=\omega_i\lambda/v_s$, wherein $e_y$ is a unit vector in a y direction; and for multi-frequency sound waves i=1, ..., N, incident light is diffracted into multiple $\theta_i$ directions simultaneously; and the sound wave frequency $\omega_i$ is exactly equal to the frequency $\omega_i$ of the RF signal controlled by programming.

Regarding the optical pulse shaping method, in step (2), the converting an array of multi-direction diffraction beams into an array of weakly focused parallel beams by using a long focal length and large imaging field-of-view lens combination is specifically as follows: if the waist of an incident Gaussian beam is w, and an effective focal length of the lens combination is F, a center position of the parallel beam after passing through the lens group is $y_i=\sin\theta_i$ F, a Gaussian waist of the weakly focused beams at the focal point is $\tilde{w}=\Delta F/\pi w$, and the Rayleigh range is $\tilde{z}_R=\lambda F^2/\pi w^2$.

Regarding the optical pulse shaping method, in step (3), efficient retro-diffraction of the parallel beam array within their Rayleigh range $\tilde{z}_R$ leading to a second pass through the lens combination and a secondary acoustic-optic deflection is specifically as follows: the retro-diffraction is performed on all multi-path parallel beams within the Rayleigh range $\tilde{z}_R$ at the center position $y_i$ of focused Gaussian beams simultaneously by using the large-area grating (a grating constant is d), and an optical delay $\tau_i$ that is directly proportional to $2y_i/c$ within delay range close to $\tau_{max}=2\tilde{Z}_R/c$ is implemented, wherein a specific expression is:

$$\tau_i = \frac{\omega_i \lambda}{v_s} \frac{F}{\pi c \sqrt{4d^2/\lambda^2 - 1}}. \quad \text{(formula 1)}$$

Regarding the optical pulse shaping method, in step (4), to perform efficient double-pass acoustic-optic diffraction and sub-pulse-parameter insensitive single-mode output coupling, by exploiting time reversal symmetry of retro-diffraction is specifically as follows: efficient diffraction $k_{out}=-k_{out,i}+k_{s,i}e_y=-k_{in}$ is formed, and the single diffraction angle $\theta_i$ independent high-quality single-mode output $k_{out}=k_{in}$ is obtained for coupling into the single-mode device, regardless of delay, amplitude, or phase of the sub-pulses.

Regarding the optical pulse shaping method, in step (5), the controlling of relative delay, amplitude, and phase of each sub-pulse through programming frequency, amplitude, and phase of a correspondent radio frequency (RF) signal for driving the acoustic-optic deflection respectively, is specifically as follows: if the frequency, the amplitude, and the phase of the RF signal are $\{\omega_i, A_{c,i}, \varphi_{c,i}\}$, a frequency, an amplitude, and a phase of a sound wave signal are precisely controlled as $\{\omega_i, A_{s,i}, \varphi_{s,i}\}$, and a relative delay, an amplitude conversion coefficient, and a phase of an optical sub-pulse sequence are precisely controlled as $\{\tau_i, A_i, \varphi_i\}$; In addition to a relationship $\omega_i \sim \tau_i$ as described in formula 1, the amplitude conversion coefficient and a phase transfer function are represented as follows:

$$A_i = \eta A_{c,i}^2 + \delta A_i(\{A_{c,j}, \varphi_{c,j}\}) \quad \text{(formula 2)}$$

$$\varphi_i = 2\varphi_{c,i} + \omega_i \tau_i + \delta\varphi_i(\{A_{c,j}, \varphi_{c,j}\}) \quad \text{(formula 3)}$$

wherein $A_i \approx \eta A_{c,i}^2$ and $\varphi_i \approx \varphi_{c,i} + \omega_{c,i}\tau_i$ are small signal approximations based on the double-pass acoustic-optic deflection, $\eta$ is a conversion coefficient, $|A_i|^2 < 1$ is a light intensity conversion ratio, and $\delta A_i(\{A_{c,j}, \varphi_{c,j}\})$ and $\delta \varphi_i(\{A_{c,j}, \varphi_{c,j}\})$ account for higher-order non-linear contribution $A_{i,c}$ in the acoustic-optic modulation process, that is, the process of RF signal amplification-RF sound wave transduction-optical Bragg diffraction; The non-linear contribution of $\delta A_i(\{A_{c,j}, \varphi_{c,j}\})$, $\delta \varphi_i(\{A_{c,j}, \varphi_{c,j}\})$ may be suppressed by limiting the diffraction efficiency $A_i \approx \eta A_{c,i}^2$ within the linear regime; or non-linear correction may be performed to optimize the amplitudes and phases toward a target optical waveform, by adjusting RF signal parameters $\{A_{c,i}, \varphi_{c,i}\}$ through real-time beat frequency measurement.

Regarding the optical pulse shaping method, in step (6), simultaneously detecting phase and amplitude of the acoustic-optic deflected sub-pulse in real time by using a continuous acoustic-optic modulation beat frequency signal, correcting relative phase drift in real time, and performing non-linear correction on the diffraction efficiency through the RF signal updates is specifically as follows: the amplitude $A_i$ and the phase $\varphi_j$ of a delay pulse are measured by monitoring the amplitude $A_{p,i}$ and the phase $\varphi_{p,i}$ of beat note signal between the CW output and a reference laser, utilizing the $2\omega_i$ frequency shift offered by the acoustic-optic deflection; the optical path experienced by the frequency-stabilized laser completely coincides with an optical path of a pulsed laser in space, there are definitely $A_{p,i} \propto A_i$, and $\varphi_{p,i} = \varphi_i + a$ constant offset; the phase offset introduced by the reference laser does not affect the relative phases between sub-pulses, so the beat note measurement is rather easy to set up to monitor in real-time the $\{A_i, \varphi_i\}$ and compare the values with set values; non-linear corrections may be performed to optimize $\{A_i, \varphi_i\}$ by adjusting the RF parameters $\{A_{c,i}, \varphi_{c,i}\}$ at the same time when the long-term stability of the phase and the amplitude of the pulsed optical path are ensured.

Regarding the optical pulse shaping method, an optical switch is added to implement time-domain separation of the frequency-stabilized laser and the pulsed laser in the single-mode output, to avoid mutual interference between measurement and application.

The present disclosure describes a system for performing the optical pulse shaping method according to any portion or all of the above.

The system may further include an RF signal programming module, an acoustic-optic modulation module, an optical lens system, a grating module, and a frequency-stabilized laser system monitoring module, wherein:

in the RF signal programming module, a user writes the frequency, amplitude, and phase of each component of an RF signal, and the programmed RF signals are then combined, amplified, and transmitted to drive the acoustic-optical deflection module in the form of sine waves;

in the acoustic-optic modulation module, an acoustic-optic device adopts an acoustic-optic modulator (AOM) or an acoustic-optic deflector (AOD), the acoustic-optic device converts the RF signal into a sound wave signal with a corresponding frequency, intensity, and phase, and performs multi-angle diffraction on an incident pulsed laser, to achieve the objective of beam splitting; based on acoustic-optic deflection principle, the deflection angles between the incident and the deflected beams are proportional to the frequencies of the sound wave signal under small angle approximation, which is thus changed quite arbitrarily by programming the frequencies of the RF signals, the amplitudes and phases of each deflected sub-pulse beams are instead controlled by the amplitudes and phases of the sound wave decided by those of the rf signals at the corresponding frequencies;

the wide-angle collimation lens module collimates multi-angle sub-pulse beams from the acoustic-optical deflection module into parallel beams, the function of the long focal length collimation system is to convert the angular difference from the AOD output into sufficiently large transverse displacements, while simultaneously ensuring weak focusing of each beams, so as to improve the response bandwidth of retro-diffraction at the grating interface;

the large-area grating module is positioned near the focal planes of the weakly focused sub-pulse beams, the orientation of the grating is optimized to ensure retro-diffraction of the negative first order, i.e., with the diffraction direction to optimally overlap with the incident direction, the transverse displacement of each sub-pulse beams leads to optical path length difference during such retro-diffraction, leading to relative optical delays among the retro-diffracted sub-pulses, wherein the delays are determined by the focal length of the optical lens system and the deflection angles of the acoustic-optic deflection module, and are thus controlled by the RF signal frequency programming;

each retro-diffracted sub-pulse then passes through the wide-angle collimation module and the acoustic-optical deflection module again, wherein the grating diffraction occurs near the Gaussian optical waist of each beam, the retro-diffraction generates approximately time-reversed wavefront for each beam, which ensures that for each beam diffracted twice by the same sound wave ends up with output direction to be the reversed direction of the original incident pulse, with an overall diffraction efficiency insensitive to the sub-pulse delay, this results in recombination of all the sub-pulse beams into the incident beam path, but along the reversed direction to be coupled into a single-mode optical device (single-mode fiber) after an optical circulator as the output, any sub-pulse beams that do not follow such reversed path is blocked from entering the output;

by controlling inter sub-pulse delays, amplitudes and phases of the sub-pulses, nearly arbitrary waveforms within the input pulse bandwidth and total delay are synthesized by the sub-pulse sequence, by rapidly and precisely programming the RF waveforms; and the frequency-stabilized waveform monitoring module is configured to detect the amplitudes and phases of the sub-pulse sequence in real time and to perform feedback so as to stabilize the waveform from the pulse shaper output.

Regarding the system, the frequency-stabilized laser monitoring module operates as follows: a frequency-stabilized laser, which is a continuous wave (CW) laser, sharing the same central wavelength as the pulsed laser is injected to the pulse shaping system, passes through all the multi-delayed paths as those for the pulsed laser, and similarly undergoes twice acoustic-optic deflections, before being coupled to the same single-mode output; for the CW laser, the acoustic-optical deflection is accompanied with pronounced RF frequency shifts; the deflection amplitudes and phases are measured by beating with a reference beam using a heterodyning setup; the CW laser and the pulsed laser share the same optical path, and the retrieved relative amplitudes and phases of each frequency sidebands directly reflect those of the sub-pulses coupled into the same output; and the overall phase factor, which is sensitive to the reference CW beam and thus hard to maintain, is not important.

Regarding the system, the grating module is expanded into multi-grating system using 4-F imaging systems to enhance the delay range; and the gratings is replaced by micro-mirror-arrays to enhance the retro-diffraction efficiency or to more finely match the wavefront curvatures beyond the beam Rayleigh ranges.

What is claimed is:

1. An optical pulse shaping method based on multi-frequency acoustic-optic modulation and retro-diffraction based multiple optical delay line generation, the optical pulse shaping method comprising:

performing, by an acoustic-optic deflector, deflection of an incident mode-locked laser beam into a multiple-directions through Bragg diffraction-based multi-frequency acoustic-optic deflection;

converting, by a lens combination, an array of multi-direction diffraction beams into an array of weakly focused parallel beams, and transmitting the array of weakly focused parallel beams incident on a grating;

performing, by the grating, retro-diffraction of the parallel beam array within their Rayleigh range $\tilde{z}_R$ leading to a second pass through the lens combination and a secondary acoustic-optic deflection;

ensuring, by an approximate time-reversal-symmetry of the retro-diffraction, a high-quality space mode and a delay range up to $\tau_{max} \sim 2\tilde{z}_R/c$ for all resulting sub-pulse, wherein c is a speed of light and a multi-sub-pulse output is coupled to a single-mode device with sub-pulse-parameter insensitive coupling efficiency;

controlling, by a radio frequency (RF) signal programming device, a relative delay, an amplitude, and a phase of each sub-pulse through programming frequency, amplitude, and phase of a correspondent RF signal for driving the acoustic-optic deflector respectively; and simultaneously detecting, by using a continuous acoustic-optic modulation beat frequency signal, a phase and an amplitude of the acoustic-optic deflected sub-pulse, correcting relative phase drift, and performing non-linear correction on diffraction efficiency through updating the RF signal.

2. The optical pulse shaping method according to claim 1, wherein:

a mode-locked laser is configured to generate the incident mode-locked laser beam with a pulse width of $\tau$ and a Fourier transform-limited spectral width of $\Delta f=1/\pi\tau$, wherein:

the pulse width is $\tau_M=N\tau_d$, $\tau_M<\tau_{max}$ is limited to a maximum delay range, and a modulation bandwidth is up to $\Delta f_M \approx 1/\pi\tau_d$, which is implemented through programming of N sub-pulse sequences with an equal-interval delay $\tau_d > \tau$, and a quasi-continuous output optical waveform with the pulse width of $\tau_M=N\tau_d$, the modulation bandwidth up to $\Delta f_M \approx 1/\pi\tau_d$, and a phase-stable arbitrarily controllable waveform within the modulation bandwidth is used for replacing a conventional continuous laser modulated by low-speed modulators, and is used for implementing efficient electric dipole excitation of atoms and molecules for internal and external quantum state optimal control.

3. The optical pulse shaping method according to claim 2, wherein:

the delay range $\tau_{max}$ is increased by using multiple groups of 4F imaging systems and retro-diffraction by multiple gratings, so that the delay range $\tau_{max} \sim 2n\tilde{z}_R/c$, wherein n is a number of paths in the multiple groups of 4F imaging systems and retro-diffraction by multiple gratings; and the multiple gratings is replaced by micro-mirror-arrays.

4. The optical pulse shaping method according to claim 3, wherein the performing, by the acoustic-optic deflector, deflection of the incident mode-locked laser beam into the multiple-directions through Bragg diffraction-based multi-frequency acoustic-optic deflection comprises:

performing multi-angle diffraction on the incident mode-locked laser pulse with a center wavelength of $\lambda$, wherein:

a sound wave with an angular frequency of $\omega_i$ drives a refractive index grating with a wave number of $k_{s,i}=\omega_i/v_s$ in an acoustic-optic crystal, wherein $v_s$ is a crystal sound velocity;

an incident light wave vector $k_{in}$ is shifted to $k_{out,i}=k_{in}+k_{s,i}e_y$ under an incident angle near the Bragg condition, to generate deflected light with a diffraction angle of $\theta_i=\omega_i\lambda/v_s$, wherein $e_y$ is a unit vector in a y direction;

for multi-frequency sound waves i=1, ... N, incident light is diffracted into multiple $\theta_i$ directions simultaneously; and the sound wave frequency $\omega_i$ is equal to the frequency of the RF signal.

5. The optical pulse shaping method according to claim 4, wherein:

a center position of the parallel beam after passing through the lens combination is $y_i=\sin\theta_i F$, a Gaussian waist of the weakly focused beams at a focal point is $\tilde{w}=\Delta F/\pi w$, and the Rayleigh range is $\tilde{z}_R=\lambda F^2/\pi w^2$, wherein w is a waist of an incident Gaussian beam and F is an effective focal length of the lens combination.

6. The optical pulse shaping method according to claim 5, wherein:

the retro-diffraction is performed on all multi-path parallel beams within the Rayleigh range $\tilde{z}_R$ at the center position $y_i$ of focused Gaussian beams simultaneously, wherein:

the grating has a grating constant as d, and an optical delay $\tau_i$ that is directly proportional to $2y_i/c$ within delay range close to $\tau_{max}=2\tilde{z}_R/c$ satisfies an expression as $$\tau_i = \frac{\omega_i \lambda}{v_s} \frac{F}{\pi c \sqrt{4d^2/\lambda^2 - 1}}.$$

7. The optical pulse shaping method according to claim 6, wherein:

efficient diffraction is formed and satisfies $k_{out}=-k_{out,i}+k_{s,i}e_y=k_{in}$, and single-mode output is obtained independent on the diffraction angle $\theta_i$ for coupling into the single-mode device, regardless of delay, amplitude, or phase of the sub-pulses, and satisfies $k_{out}=-k_{in}$.

8. The optical pulse shaping method according to claim 7, wherein:

the frequency, the amplitude, and the phase of the RF signal are $\{\omega_i, A_{c,i}, \varphi_{c,i}\}$, a frequency, an amplitude, and a phase of a sound wave signal are controlled as $\{\omega_i, A_{s,i}, \varphi_{s,i}\}$, and a relative delay, an amplitude conversion coefficient, and a phase of an optical sub-pulse sequence are controlled as $\{\tau_i, A_i, \varphi_i\}$, and satisfy: $A_i=\eta A_{c,i}^2+\delta A_i(\{A_{c,j}, \varphi_{c,j}\})$ and $\varphi_i=2\varphi_{c,i}+\omega_i\tau_i+\delta\varphi_i(\{A_{c,j}, \varphi_{c,j}\})$, wherein:

$A_i \approx \eta A_{c,i}^2$ and $\varphi_i \approx 2\varphi_{c,i} + \omega_i \tau_i$ are small signal approximations based on the double-pass acoustic-optic deflection, $\eta$ is a conversion coefficient, $|A_i|^2 < 1$ is a light intensity conversion ratio, and $\delta A_i(\{A_{c,j}, \varphi_{c,j}\})$ and $\delta \varphi_i(\{A_{c,j}, \varphi_{c,j}\})$ account for higher-order non-linear contribution $A_{i,c}$ in the acoustic-optic modulation process, the process of RF signal amplification-RF sound wave transduction-optical Bragg diffraction; the non-linear contribution of $\delta A_i(\{A_{c,j}, \varphi_{c,j}\}), \delta \varphi_i(\{A_{c,j}, \varphi_{c,j}\})$ is suppressed by limiting the diffraction efficiency $A_i \approx \eta A_{c,i}^2$ within a linear regime; or non-linear correction is performed to optimize the amplitudes and phases toward a target optical waveform, by adjusting RF signal parameters $\{A_{c,i}, \varphi_{c,i}\}$ through real-time beat frequency measurement.

9. The optical pulse shaping method according to claim 8, wherein:

the amplitude $A_i$ and the phase $\varphi_i$ of a delay pulse are measured by monitoring the amplitude $A_{p,i}$ and the phase $\varphi_{p,i}$ of beat note signal between a continuous wave (CW) output and a reference laser, utilizing a $2\omega_i$ frequency shift offered by the acoustic-optic deflection;

an optical path experienced by a frequency-stabilized laser completely coincides with an optical path of a pulsed laser in space, wherein $A_{p,i} \propto A_i$, and $\varphi_{p,i} = \varphi_i + a$ constant offset;

the phase offset introduced by the reference laser does not affect the relative phases between sub-pulses, so a beat note measurement is set up to monitor in real-time the $\{A_i, \varphi_i\}$ and compare the values with set values;

non-linear corrections are performed to optimize $\{A_i, \varphi_i\}$ by adjusting the RF parameters $\{A_{c,i}, \varphi_{c,i}\}$ at the same time so as to ensure long-term stability of the phase and the amplitude of the pulsed optical path.

10. The optical pulse shaping method according to claim 9, wherein:

an optical switch is disposed to implement time-domain separation of the frequency-stabilized laser and the pulsed laser in the single-mode output, to avoid mutual interference between measurement and application.

11. A system for performing an optical pulse shaping method, the system comprising:

a radio frequency (RF) signal programming device, an acoustic-optic device comprising at least one of an acoustic-optic modulator or an acoustic-optic deflector, an optical lens system, a grating, and a frequency-stabilized laser system monitor, wherein:

in the RF signal programming device, a user writes the frequency, amplitude, and phase of each component of an RF signal, and programmed RF signals are then combined, amplified, and transmitted to drive the acoustic-optical device in forms of sine waves;

the acoustic-optic device converts the RF signal into a sound wave signal with a corresponding frequency, intensity, and phase, and performs multi-angle diffraction on an incident pulsed laser, to achieve an objective of beam splitting;

based on acoustic-optic deflection principle, deflection angles between the incident pulsed laser and deflected beams are proportional to the frequencies of the sound wave signal under small angle approximation, so as to be configured by programming the frequencies of the RF signals, the amplitudes and phases of each deflected sub-pulse beams are controlled by the amplitudes and phases of the sound wave decided by those of the RF signals at the corresponding frequencies;

the optical lens system comprises a wide-angle collimation lens to collimate multi-angle sub-pulse beams from the acoustic-optical device into parallel beams by converting angular difference from acoustic-optical device output into transverse displacements, while ensuring weak focusing of each beams, so as to improve a response bandwidth of retro-diffraction at the grating interface;

the grating is positioned near focal planes of weakly focused sub-pulse beams, the orientation of the grating is optimized to ensure retro-diffraction of a negative first order to optimally overlap with an incident direction, the transverse displacement of each sub-pulse beams leads to optical path length difference during the retro-diffraction, leading to relative optical delays among the retro-diffracted sub-pulses, wherein the relative optical delays are determined by a focal length of the optical lens system and the deflection angles of the acoustic-optic device, and are controlled by the frequency of the RF signal;

each retro-diffracted sub-pulse passes through the wide-angle collimation lens and the acoustic-optical device again, wherein the grating diffraction occurs near a Gaussian optical waist of each beam, the retro-diffraction generates approximately time-reversed wavefront for each beam, which ensures that for each beam diffracted twice by the same sound wave ends up with output direction to be the reversed direction of the original incident pulse, with an overall diffraction efficiency insensitive to the sub-pulse delay, resulting in recombination of all the sub-pulse beams into an incident beam path, and along a reversed direction to be coupled into a single-mode optical device after an optical circulator as the output, any sub-pulse beams that do not follow such reversed path is blocked from entering the output;

by controlling inter sub-pulse delays, amplitudes and phases of the sub-pulses, nearly arbitrary waveforms within an input pulse bandwidth and total delay are synthesized by the sub-pulse sequence, by programming the RF waveforms; and the frequency-stabilized laser system monitor is configured to detect the amplitudes and phases of the sub-pulse sequence in real time and to provide feedback for stabilizing a waveform from the output.

12. The system according to claim 11, wherein:

a continuous wave (CW) laser with a same central wavelength as the pulsed laser is injected to the pulse shaping system, passes through all multi-delayed paths as the pulsed laser does, and undergoes twice the acoustic-optic device, before being coupled to the same output;

for the CW laser, the acoustic-optical device is accompanied with RF frequency shifts;

deflection amplitudes and phases are measured by beating with a reference beam using a heterodyning setup; and the CW laser and the pulsed laser share a same optical path, and retrieved relative amplitudes and phases of each frequency sidebands directly reflect those of the sub-pulses coupled into the same output.

13. The system according to claim 11, wherein:
the grating is expanded into multi-grating system using 4-F imaging systems to enhance delay range; and
gratings in the multi-grating system are replaced by micro-mirror-arrays to enhance retro-diffraction efficiency or to more finely match wavefront curvatures beyond beam Rayleigh ranges.

* * * * *